United States Patent
Ohmi et al.

(10) Patent No.: US 6,728,745 B1
(45) Date of Patent: Apr. 27, 2004

(54) SEMICONDUCTOR CIRCUIT FOR ARITHMETIC OPERATION AND METHOD OF ARITHMETIC OPERATION

(75) Inventors: Tadahiro Ohmi, 1-17-301, Komegabukuro 2-chome, Aoba-ku, Sendai-shi, Miyagi-ken 980-0813 (JP); Makoto Imai, Miyagi-ken (JP); Toshiyuki Nozawa, Miyagi-ken (JP); Masanori Fujibayashi, Miyagi-ken (JP); Koji Kotani, Chiba-ken (JP); Tadashi Shibata, Tokyo (JP); Takahisa Nitta, Tokyo (JP)

(73) Assignees: Tadahiro Ohmi (JP); Kabushiki Kaisha Ultraclean Technology Research Institute (JP); I & F, Inc. (JP)

( * ) Notice: Subject to any disclaimer, the term of this patent is extended or adjusted under 35 U.S.C. 154(b) by 0 days.

(21) Appl. No.: 09/581,729
(22) PCT Filed: Dec. 17, 1998
(86) PCT No.: PCT/JP98/05720
§ 371 (c)(1), (2), (4) Date: Sep. 6, 2000
(87) PCT Pub. No.: WO99/31573
PCT Pub. Date: Jun. 24, 1999

(30) Foreign Application Priority Data

Dec. 17, 1997 (JP) .............................. 9-348313

(51) Int. Cl.$^7$ ................................ G06F 7/50; G06F 7/00
(52) U.S. Cl. ..................................... 708/705; 708/493
(58) Field of Search ................................. 708/493, 705

(56) References Cited

U.S. PATENT DOCUMENTS 5,034,908 A * 7/1991 Hartley et al. .............. 708/319

FOREIGN PATENT DOCUMENTS

| JP | 58-3028 A | 1/1983 | ............. G06F/7/00 |
| JP | 4-98319 A | 3/1992 | ............. G06F/7/00 |

* cited by examiner

Primary Examiner—Tan V. Mai
(74) Attorney, Agent, or Firm—Randall J. Knuth

(57) ABSTRACT

There is provided a semiconductor circuit for arithmetic processing and an arithmetic processing method that can increase the rate of processing data and reduces the area of a circuit by suppressing wasteful processing. There is provided a computing unit for computing input data within a computation time unit and outputs a computation result representing a result obtained by the computation, and if a carry is generated in the computation a computation circuit (adders 1–3) for outputting carry data representing this carry, and delay means (memory 4) for delaying the computation result from the computation circuit by one computation time unit, are provided.

16 Claims, 23 Drawing Sheets

Fig. 16

SEMICONDUCTOR CIRCUIT FOR ARITHMETIC OPERATION AND METHOD OF ARITHMETIC OPERATION

TECHNICAL FIELD

This invention relates to a semiconductor circuit for arithmetic processing and an arithmetic processing method, and particularly to a semiconductor circuit for arithmetic processing and an arithmetic processing method using information processing and device control.

BACKGROUND ART

In the field of information processing etc., semiconductor circuits are responsible for numerical computation and logical computation. Accordingly, semiconductor circuits are extremely important in the field of information processing etc., and various circuits are currently being designed.

In semiconductor circuits, first of all information is divided into analog information and digital information, but it is necessary to perform arithmetic processing after converting all information to digital information in order to carry out computation maintaining high reliability. For this reason, it is a general rule in the present invention that analog information is converted to multi-value information or a digital signal and then arithmetic processing is carried out.

Information that has been converted to digital becomes numerical information, and depending on the range of the numerical information obtained data having a bit width of 8 bits, 16 bits, 32 bits, or currently 64 bits or 128 bits, is used. Circuit types for processing this type of multi-bit information are generally classified into bit parallel circuits and bit serial circuits.

Bit parallel processing involves providing a calculating circuit for all bits, inputting data sequentially in bit units from the lower order bit, and performing calculation processing. It is no exaggeration to say that as well as microprocessors, almost all current processors adopt this method.

Bit serial processing is a method of computational processing where data is input in bit units sequentially from lower order bits every computation time unit (normally a clock). With this method it is possible to design computation circuits for 1 bit, and has the advantage that surface area is small. However, since this method to carries out processing from a lower order digit, there is the disadvantage that it takes am extremely long time to acquire data of the most significant digit.

If it could be said that either the high order digit or the low order has more important information, then normally the high order has the most important information. That is why the highest order digit is called the Most Significant Digit. However, carrying out the conventional bit serial processing from the low order digit causes a "carry signal" problem in addition computation etc.

In a carry signal and addition result generated by addition computation, first of all the digit (decimal number) as the first placed number is different, and it is not possible to handle in the same level.

Also, in the worst case there is a possibility of a carry signal generated from the least significant digit being propagated to the most significant digit, and it is necessary to determine a solution and a carry signal from the least significant digit. Computational processing from an upper digit is impossible in the present invention without solving this carry propagation problem.

Naturally, with computation that is not equivalent to a carry signal, such as a simple size judgement circuit, for example, there are arithmetic processing semiconductor circuits including comparative judgment from an upper digit. However, there are no inventions for arithmetic processing from an upper order digit including arithmetic processing so as to include a carry signal.

The object of the present invention is to provide an semiconductor circuit for arithmetic processing and an arithmetic processing method that can carry out arithmetic processing from an upper digit sequentially in bit serial format, with priority given to an upper order digit containing more important information.

In order to achieve the above described object, a first aspect of the present invention solves the problem of carry signal overflow in addition computation, a second aspect of the present invention solves the problem of carry propagation, a third aspect of the present invention solves the problem of computation speed for bit serial format, and a fourth aspect of the present invention makes it possible to perform complicated computation and processing, other than multiplication, from an upper digit.

DISCLOSURE OF THE INVENTION

Computation that is a subject of the present invention is computation from an upper digit on data bit serially input every time step (computation time units), and resolves a generated carry signal using various means, and realizes applications uses as a result.

A semiconductor circuit for arithmetic processing of the present invention is a semiconductor circuit receiving as input at least one numerical data item comprised of a plurality of digits, input sequentially one digit per computing time unit from an upper digit of the numerical data, and is provided with a computing unit for computing of the input data. The computing unit comprises a computing circuit for computing input digit data within a computing time unit, and outputting a computation result representing a result obtained by the computation to generate a carry using the computation and outputting carry data representing this carry, and delay means for delaying the computational result from the computing circuit by only a single computing time unit. Using this delay, the first aspect of the present invention resolves the problem of carry signal overflow without the need for specialized handling of the carry signal as a carry signal.

The problem of carry propagation in the semiconductor circuit for arithmetic processing of the present invention can be solved with the second aspect of the present invention by any of three methods.

First of all, using a method of representing output data using a redundant number system. Secondly, here is a method comprising first decision means for deciding whether or not the carry data output to an upper digit by computation of a particular digit is changed using carry data generated by computation for a lower digit than that digit, output means for indicating the fact that there is no change to carry data to an upper order side, when tho decision result from the first decision means indicates that there is no dependency on carry data output from the lower order digit, input means for holding lower order side carry data, when the decision result from the first decision means indicates that there is dependency on carry data output from the lower order digit, and changing means for changing the computational result in response to lower order digit carry data from the lower order side. Thirdly, there is a method comprising computing means for sequentially carrying out computation every computing time unit from an upper digit side and computing a maximum value and a minimum value for computational results acquired at the lower digit than an input digit, and comparison means for comparing at least one of the maximum value and the minimum value computed by the computing means with data of another digit.

The third aspect of the present invention is a semiconductor circuit for arithmetic processing provided with decision means for comparing and deciding, every computing time unit from an upper digit, computational results output sequentially every computing time unit from the upper digit, and when the authenticity of the decision result of the decision means has been confirmed arithmetic processing including comparison and decision for remaining lower order digits is omitted.

A fourth aspect of the semiconductor circuit for arithmetic, processing of the present invention receives one of two data items as a multiplicand and the other as a multiplier, and sequentially inputs the multiplier every computing time unit from the upper order digit, and outputs the result of multiplying the two data items sequentially every computing time unit from an upper order digit, and comprises storage means for storing the multiplier while shifting it every one computing time unit, first computing means for respectively computing partial products of the multiplier from the storage means and the multiplicand, and generating and outputting all partial products of the same digit for the multiplicand sequentially from the most significant digit every computing time unit, and second computing means for adding all partial products representing the same digit from the first computing means to output one multiplication result from an upper order digit.

An arithmetic processing method of the present invention involves receiving input of at least one numerical data item comprised of a plurality of digits, input sequentially from an upper order digit of the numerical data, and includes a first process of computing data of an input digit in computing time units and outputting a computation result obtained by computation, a second process of generating a carry as a result of the computation of the first process and outputting carry data representing this carry, and a third process of delaying the computational result by only a single computing time unit.

BRIEF DESCRIPTION OF THE DRAWINGS

FIG. 16 is an explanatory drawing for describing multiplication in the eleventh embodiment.

FIG. 22 is a block diagram showing one example of a carry control circuit of the fourteenth embodiment.

DESCRIPTION OF SYMBOLS

Figure 1:
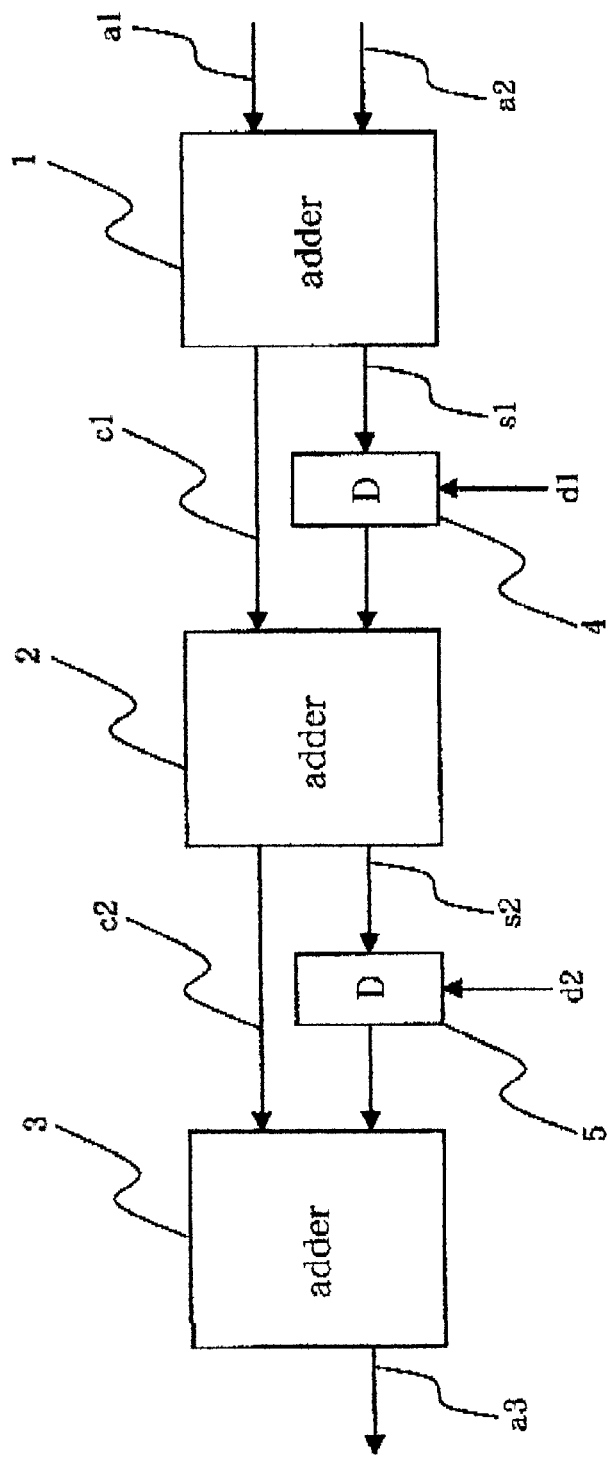
FIG. 1 is a block diagram showing a semiconductor circuit for arithmetic processing of a first embodiment of the present invention.

1–3, 21, 26A, 26B, 56A, 56E, 56B–56D, 61 adder
4, 5, 8, 9, 14, 33, 41A, 41B, 602, $68_1$–$68_n$ memory
101A–101C, 201A, 201B neuron MOS inverter
101D–101F, 201C, 201D inverter
6, 7 difference circuit
10 minimum value circuit
11 difference circuit
12 forward rotation circuit
13 state storage circuit
22 delay circuit
23, 27, 28 comparator
24 storage circuit
29 AND gate
31, 32 general purpose circuit
36 A/D converter
37 calculation circuit
42A, 42B data bus
43 semiconductor circuit for arithmetic processing
45A–45H shift register
46A–46H partial product generating circuit
47A–47D, 48A, 48B, 49 redundant adder 51A–51H, 52A–52D, 53A, 53B, 54 general purpose calculator
61m–63m delay element
56 adding line section
57 redundant adder
62, 63 carry control circuit
601 state control circuit
603 output circuit
66 redundant conversion circuit
$67_1$–$67_n$ carry processing circuit
a1–a9, a11, a12, a21, a22, a26, a27, a31–a33, b31, $a51_1$–$a51_{16}$, a61, a36 analog signal
a55 multiplicand
a56 multiplier
a62, a66 data
b6, b7, b12 difference signal
b21, b56, c56, b62, c62, d62, s1, s2 addition signal
b26 maximum value signal
b27 minimum value signal
b36 digital signal
b51, c52, d53 control instruction
b63, c63, d63 state signal
b67, b68, c67 conversion result
c1–c4, b11, c26, c27, b55, c55, b61, c61, d61, b66, c6, c21, d11, d31, e55, d66 control clock
c11 absolute value signal
c66 carry signal
d1, d2, b32, c31, c32, b37, e22, a601 control signal
d21, d22 average value signal
s3, s4 intermediate sum component
A37 half range
A38 quarter range
A39 eighth range
A45 range
A55, A56 line
B1, A36 full range
B2–B5 range
T1–T5, T71–T74 timing Embodiments Embodiments of the present invention will now be described with reference to the drawings.

In the following description, "digit" has the following meaning. Specifically, when data is represented by a numerical value, a "digit" refers to a unit when this data is subjected to arithmetic processing, and in the decimal system is called a "position". "computation" is not limited to numerical computation, and also includes logical computation. Specifically, "upper order digit" represents a digit one digit larger than a digit currently being processed, while a "lower order digit" represents a digit one digit smaller. "upper order digit side" refers to upper order digits of a plurality of digits continuous from a digit currently being processed, while "lower order digit side" refers to lower order digits of a plurality of digits continuous from a digit currently being processed.

Also, a "redundant number system" refers to a number system that permits each digit of an N base system to assume at least N+1 values.

[First Embodiment]

A first embodiment is an application of the present invention to a semiconductor circuit for arithmetic processing for adding data. In the first embodiment, a binary SD (signed digit) number system is used as a redundant base n number system. The binary SD number system is one redundant number system, and permits numbers of redundant value called "−1", that were not available originally, for binary numbers comprised of combinations of "0's" and "1's". An example of an arithmetic rule using this binary SD number system is shown in table 1. In the following description, for example, when data "010" is represented in the binary SD number system this data is shown as "010"$_{SD}$, while when data "010" is being represented in the binary system the data is shown as "010"$_S$. Also, data "2" being represented in the decimal system is shown as "2"$_D$.

TABLE 1

|   |    | A |   |   |
|---|----|---|---|---|
|   |    | −1 | 0 | 1 |
| B | −1 | −1 · 0 | −1 · 1<br>0 · −1 | 0 · 0 |
|   | 0  | −1 · 1<br>0 · −1 | 0 · 0 | 0 · 1<br>1 · −1 |
|   | 1  | 0 · 0 | 0 · 1<br>1 · −1 | 1 · 0 |

In table 1, the two characters before the symbol "." represent the "carry", while the single character after the symbol represents the "sum". Table 1 is an arithmetic rule representing addition of value A and value B. The result of adding the two values is represented by a "sum" value and a "carry" value. At this time, "sum" represents the added value of value A and value B, and "carry" represents carry data. In the following, "carry" is called a carry signal and "sum" is called a sum signal. It is possible for "1" to "−1" to be generated as the "carry", and there are also combinations of a number of representation techniques.

With this binary SD number system, for example, when calculation is performed from the least significant digit in the case of addition there is a technique of only propagating a carry signal generated in the addition to an upper order 2 digits. Specifically, the carry signal only has an effect as far as the addition result of the two upper order digits from the digit where that signal was generated. This is a characteristic feature of the binary SD number system.

A semiconductor circuit for arithmetic processing using this binary SD number system is shown in FIG. 1. The semiconductor circuit for arithmetic processing of FIG. 1 comprises adders 1–3 and memories 4 and 5.

The adder 1 is an initial stage, that is, an input side, computing circuit inside the semiconductor circuit for arithmetic processing. Data a1 and data a2 are input to the adder 1. The data a1 represents one digit within a number, and the data a2 represents one digit within another number. The numbers are represented in the binary SD number system, and so data a1 and data a2 are both one of "−1", "0" or "1". The digits represented by data a1 and data a2 are sequentially input to the adder 1 from the highest order within the numbers.

The adder 1 reads in the data a1 an a1 on the rising edge of a pulse included in a control signal, and adding of the data a1 and the data a2 is performed before the rising edge of the next control signal. When the data a1 and the data a2 are added, the adder 1 follows the arithmetic rule shown in the following table 2.

TABLE 2

| input<br>(A + B) | internal sum<br>value | carry signal | sum signal |
|---|---|---|---|
| (−1) + (−1) | −2 | −1 | 0 |
| (−1) + 0 | −1 | −1 | 1 |
| 0 + (−1) |   |   |   |
| 0 + 0 |   |   |   |

TABLE 2-continued

| input (A + B) | internal sum value | carry signal | sum signal |
|---|---|---|---|
| (−1) +1 | 0 | 0 | 0 |
| 1 + (−1) | | | |
| 0 + 1 | 1 | 0 | 1 |
| 1 + 0 | | | |
| 1 + 1 | 2 | 1 | 0 |

Values of each digit represented by data a1 and data a2 are in the range "−1"–"1", which means that an addition result inside internal to the adder 1 is in the range "−2" to "2". When the addition result is "−2" the adder 1 makes the value of a carry signal c1 of the binary SD number system "−1", and makes the sum signal s1 "0". The adder 1 outputs the carry signal c1 having a value "−1" to the adder 2 and outputs the sum signal having the value "0" to the memory 4.

When the addition result inside the adder 1 is "2", the adder 1 makes the value of the carry signal c1 "1", and makes the value of the sum signal s1 "0". When the addition result inside the adder 1 is "0", the adder 1 makes the values of the carry signal c1 "1" and the sum signal s1 "0".

When the addition result inside the adder 1 is "−1", the adder 1 makes the value of the carry signal c1 "−1", and makes the value of the sum signal s1 "1". When the addition result inside the adder 1 is "1", the adder 1 makes the value of the carry signal c1 "0", and makes the value of the sum signal s1 "1". That is, when the addition result internal to the adder 1 has a value of "−1" or "1", the adder 1 outputs "1" as the value of the sum signal s1.

The memory 4 stores the sum signal s1 from the adder 1 on the rising edge of control signal d1. A period of time from the rising edge of the control signal d1 to next rising edge of the control signal d1 constitutes a computation time unit (step). That is, the memory 4 delays the value of the sum signal s1 by a single computation time unit of control signal d1 (from a pulse of the control signal to the next pulse), then outputs the sum signal s1 to the adder 2. In the first embodiment a D-type flip-flop for reading data on the rising edge of a pulse is used as the memory 4. It is also possible to use an RS flip-flop or a JK flip-flop instead of the D-type flip-flop.

Figure 2:
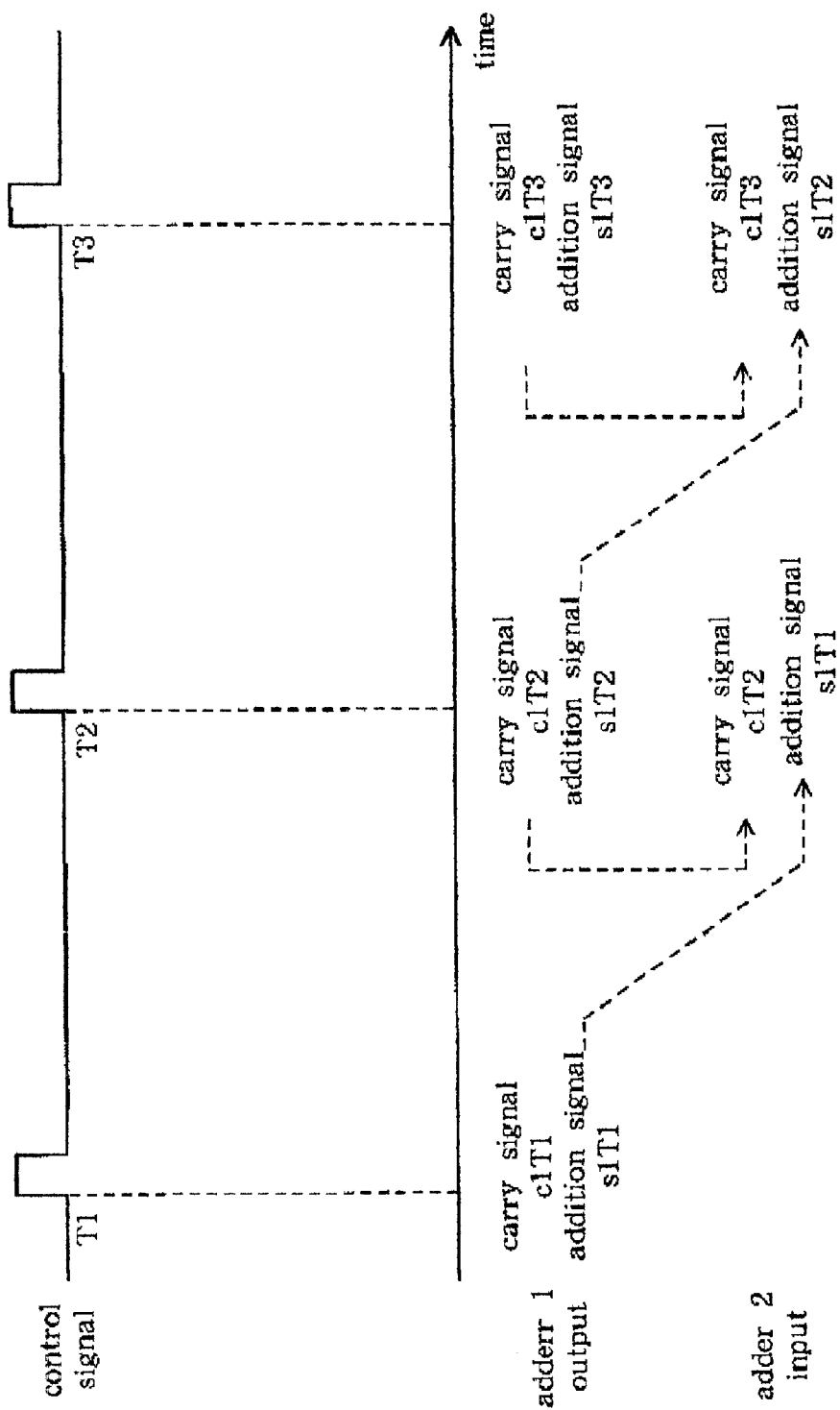
FIG. 2 is an explanatory drawing describing the data input timing for an adder 2 of the first embodiment.

The adder 2 is an intermediate stage computing circuit inside the semiconductor circuit for arithmetic processing. The carry signal c1 and the sum signal s1 are input to the adder 2. At this time, since the sum signal s1 is delayed by the memory 4 combinations of the carry signal c1 and the sum signal s1 as shown in FIG. 2 are input to the adder 2. The adder 2 outputs a carry signal $c1_{T1}$ and a sum signal $s1_{T1}$ at time T1 on the rising edge of a control signal, and outputs a carry signal $c1_{T2}$ and a sum signal $s1^{T2}$ at time T2. The adder 2 also outputs a carry signal $c1_{T3}$ and a sum signal $s1_{T3}$ at time T3.

When in this state, since the sum signals $s1_{T1}$–$s1_{T3}$ are delayed by the memory 4, a combination of carry signal $c1_{T2}$ and sum signal $s1_{T1}$ are input to the adder 2 at time T2, while a combination of carry signal $c1_{T2}$ and sum signal $s1_{T2}$ is input at time T3.

The adder 2 reads in carry signal c1 and sum signal s1 on the rising edge of the control signal and performs addition of the carry signal c1 and the sum signal s1 before the next rising edge of the control signal. When adding the carry signal c1 and the sum signal s1 the adder 2 follows the arithmetic rule shown in table 3 below.

TABLE 3

| input (c1 + s1) | internal sum value | carry signal | sum signal |
|---|---|---|---|
| (−1) + (1) | −1 | 0 | −1 |
| 0 + 0 | 0 | 0 | 0 |
| (−1) + 1 | | | |
| 1 + 0 | 1 | 1 | −1 |
| 0 + 1 | | | |
| 1 + 1 | 2 | 1 | 0 |

Each of the digits of the carry signal c1 are values in the range "−1"–"1", and each digit of the sum signal s1 is a value of "0" or "1", which means that the addition result inside the adder 2 is in the range "−1" to "2". When the addition result inside the adder 2 is "2", the adder 2 sets the value of the carry signal c2 in the binary SD number system to "1" and the value of the sum signal s2 to "0". The adder 2 outputs the carry signal c2 of value "1" to the adder 3 and outputs the sum signal s2 of value "0" to the memory 5. When the addition result inside the adder 2 is "0", the adder 2 sets the values of the carry signal c2 and the sum signal s2 to "0".

When the addition result inside the adder 2 is "−1", the adder 2 sets the value of the carry signal c2 to "0" and the value of the sum signal s2 to "−1", and when the addition result inside the adder 2 is "1", the adder 2 sets the value of the carry signal c2 to "1" and the value of the sum signal s2 to "−1". In this way, when the internal addition result becomes "−1" or "1", differing from adder 1 the adder 2 outputs "−1" as the value of the sum signal s2. The binary SD number system is a redundant number system, and the fact that one number can be represented in two ways is utilized in the adder 2.

The memory 5 and the memory 4 are the same. Specifically, the memory 5 reads the sum signal s2 from the adder 2 on the rising edge of the control signal d2. In this way the memory 5 delays the value of the sum signal s2 by a single computing time unit of the control signal and outputs the delayed sum signal s2 to the adder 3.

The adder 3 is a final stage, namely an output side, computing circuit inside the semiconductor circuit for arithmetic processing. The carry signal c2 and the sum signal s2 are input to the adder 3. At this time, since the sum signal s2 is delayed by the memory 5 the sum signal s2 outputted by the adder 2 one computation time unit before is input to the adder 3.

The adder 3 reads in the carry signal c2 and the sum signal s2 in the rising edge of a pulse of a control signal, and performed addition of the carry signal c2 and the sum signal s2 before the rising edge of the next pulse. When adding the carry signal c2 and the sum signal s2, the adder 3 follows the arithmetic rule shown in table 4 below.

TABLE 4

| input (c2 + s2) | addition result | output |
|---|---|---|
| 0 + (−1) | −1 | −1 |
| 0 + 0 | 0 | 0 |
| 1 + (−1) | | |
| 1 + 0 | 1 | 1 |

Values that can be used for the carry signal c2 are "0" and "1", while values that can be used as the sum signal s2 are "−1" and "0", which means that the addition result inside the adder 3 is in the range "−1" to "1". The adder 3 outputs the internal addition result as it is as data a3. That is, a carry signal representing carry in the binary SD number system is not included in the addition result of the adder 3.

Operation of the first embodiment will be described next.

Here, an example where data $[100]_{SD}$ and data $[00-1]_{SD}$ are added, specifically $$[100]_{SD} + [00-1]_{SD}$$

will be described.

The two data items are $$[100]_{SD} = [4]hd D$$

$$[00-1]_{SD} = [-1]_D$$

which means that the addition result will be a value of $[3]_D$ in the decimal system. Computation for this addition is carried out as follows.

Figure 3:
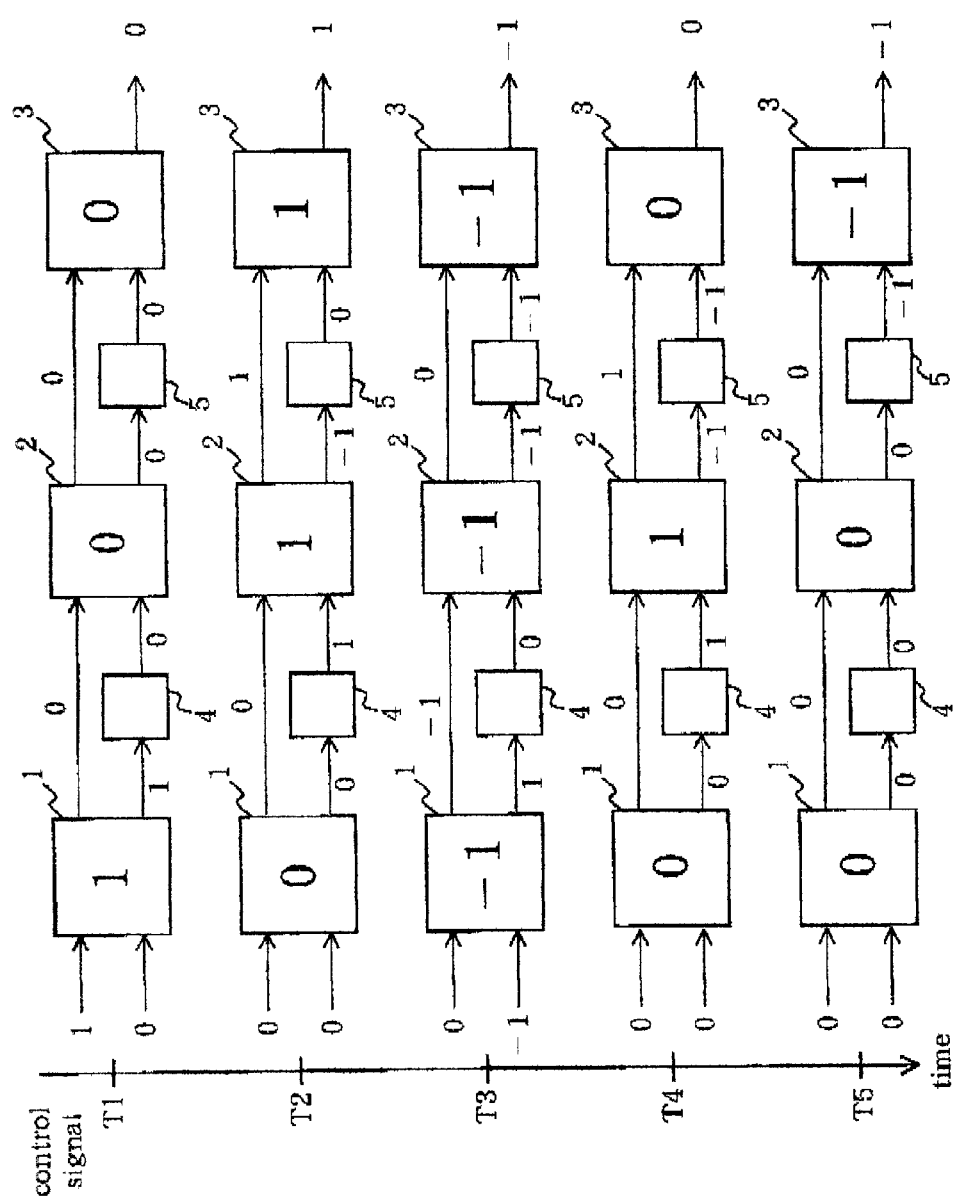
FIG. 3 is an explanatory drawing describing elements of the adder of the first embodiment.

As shown in FIG. 3, at time T1 of the control signal, "1" representing the most significant digit of $[100]_{SD}$ and "0" representing the mist significant digit of $[00-1]_{SD}$ are input from the previous stage circuit to the adder 1 as data a1 and data a2. As a result, the internal addition result becomes "1" and so the adder 1 follows the arithmetic rule shown in table 2 to make the value of the carry signal c1 "0" and make the value if the sum signal s1 "1". The memory 4 receives "1" from the adder 1 and outputs this value at the next time T2. As a result, at the point in time where the sum signal s1 having a value of "1" is received, the sum signal s1 having a value of "0" is output.

The adder 2 adds a value "0" of the carry signal c1 received from the adder 1 and a value "0" of the sum signal s1 received from the memory 4. As a result, the internal addition result becomes "0" which means that the adder 2 follows the truth able shown in table 3 to set the values of both the carry signal c2 and the sum signal s2 to "0". The memory 5 outputs value "0" received the previous time.

The adder 3 adds the value "0" of the carry signal c2 received from the adder 2 and the value "0" of the sum signal s2 received from the memory 4. As a result, the internal addition result becomes "0" and so the adder 3 follows the arithmetic rule shown in table 4 and sets the value of data a3 to "0".

At time T1 of the control signal data a3 having a value of "0" is output to the final stage circuit as a computation result for the most significant digit.

At time T2 of the control signal, "0" representing second digit from the most significant digit in the data $[100]_{SD}$, and "0" representing the second digit from the most significant digit in the data $[00-1]_{SD}$, are input to the adder 1 from a previous stage circuit. In the same way as for the case of time T1, adders 1–3 use the arithmetic rules 2–4, and the memories 4 and 5 delay the values to add the second digits. As a result, data a3 having a value of "1" is output to the final stage circuit at time T2 of the control signal.

At time T3 of the control signal, "0" representing third digit from the most significant digit in the data $[100]_{SD}$, and "−1" representing the third digit from the most significant digit in the data $[00-1]_{SD}$, are input to the adder 1 from a previous stage circuit. In the same way as for the case of time T1, adders 1–3 and the memories 4 and 5 add the third digits. As a result, data a3 having a value of "−1" is output to the final stage Circuit at time T3 of the control signal.

At time T4 of the control signal, in order to complete the computation, values of "0" are respectively input to the adder 1 as data a1 and a2 of a previous stage circuit. As a result, data a3 having a value of "0" is output to the final stage circuit at time T4. At time T5 of the control signal, similarly in order to complete the computation, values of "0" are respectively input to the adder 1 as data a1 and a2 of a previous stage circuit. As a result, data a3 having a value of "−1" is output to the final stage circuit at time T5.

Using T1 to T5, the value of data output to the final stage circuit by the adder 3 becomes $[01-10-1]_{SD}$. This data becomes $[3]_D$ in the decimal system, and so the correct result is output.

In this way, according to the first embodiment, when adding two data items, since a carry signal does not occur addition from the most significant digit is possible. Specifically, by providing the memories 4 and 5 as delay means, and with an extremely simple structure of only computation circuits 1–3 for necessary digits, it is possible to carry out all addition processing from an upper order digit in single digit or multiple digit units. That is, addition is realized with a small scale circuit.

Also, first embodiment is not limited to addition from an upper order bit, and includes subtraction, and all computations that require a carry signal can be realized. Generally, information has more important elements in the upper digits than in the lower digits, and so by carrying out processing from the upper order digit it becomes possible to acquires effective information earlier. Also, since there is a computation circuit for one digit, there is also the advantage that miniaturization is possible.

With the first embodiment, a binary SD number system is used for the values of data a1 and data a2, but it is also possible to use ordinary binary. It is possible to use clock pulses as each, of the control signals. At that time, the memories 4 and 5 store values on the clock edge.

Addition is also possible with a decimal 11-valued redundant number system, using a circuit structure similar to the first embodiment. Redundant numbers do not have to be negative, and there is no problem if they extend in a positive direction With the first embodiment, the adder was a three stage structure, but if the adder is made having four or more stages it is possible to realize an adder with multiple inputs from an upper order digit.

Further, a carry signal generated in a binary SD number system is conveyed to two upper order digits, but compared to the binary SD number system, with a number system having a large degree of redundancy propagation of the carry signal is kept to one upper order digit. As a result, to make the adder a two stage adder.

[Second Embodiment]

In the second embodiment, the adder 1 and the adder 2 of the first embodiment are implemented as described in the following. Specifically, because of this two digit binary, comprising combinations of "0" and "1", is used. According to two digit binary there are four combinations of "0" and "1". In the second embodiment, "0" in the binary SD number system is expressed two ways in binary. Accordingly, "1", "0" and "−1" in the binary SD number system is expressed as follows in binary.

"−1" in binary SD . . . $[11]_B$

"0" in binary SD . . . $[00]_B$, $[10]_B$

"1" in binary SD . . . $[01]_B$

Using binary SD "1", "0" and "−1" expressed in this way means the adder 1 becomes as follows. For example, in the case of data a1 of "0" and data a2 of "−1", data a1 being a value of $[00]_B$ and data a2 being a value of $[11]_B$ are input to the adder 1.

Inside the adder 1, if binary SD representation is used, the additional result is "−1". In this case, In accordance with table 2, the value of the carry signal is "−1", $[11]_B$ is output as the carry signal and $[01]_B$ is output as the sum signal.

In this way, when inputs are $[00]_B$ and $[11]_B$ in the case of adder 1, outputs are $[11]_B$ and $[01]_B$. Further, based on other combinations of inputs and outputs, the adder 1 can be constructed using AND gates, OR gates and NOT gates.

There are various matches for "−1", "0" and "1" constituting the binary SD number system in the binary system. Because of these matches, combinations are possible that are not limited to the AND, OR and NOT of the AND gates OR gates and NOT gates.

Also, besides a circuit structure using combinations of AND gates, OR gates and NOT gates, design is possible with combinations of other logical functions.

[Third Embodiment]

In the third embodiment, the adder 1 and the adder 2 of the first embodiment have the following structure.

Figure 4:
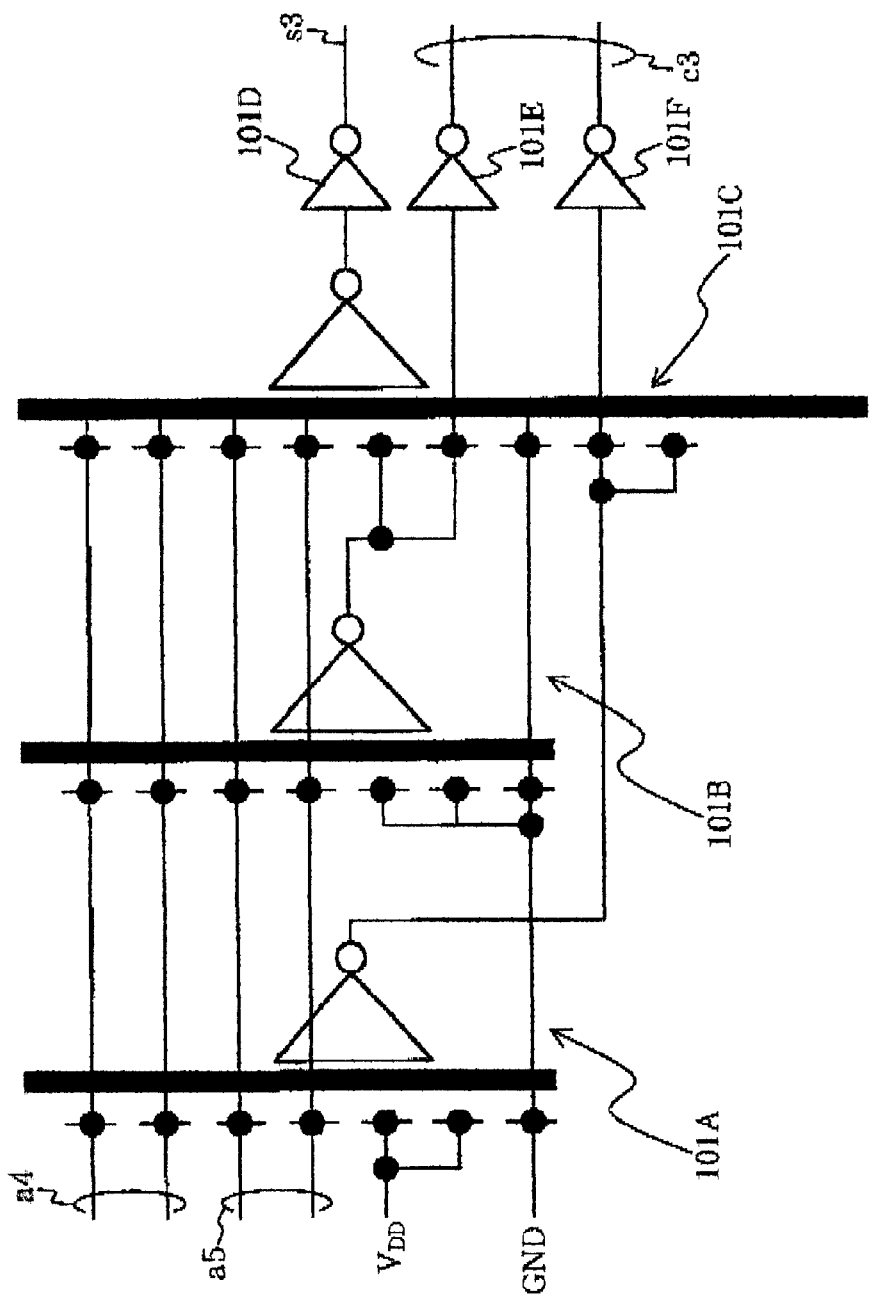
FIG. 4 is a circuit diagram of an initial stage adder used in a third embodiment.

Specifically, the adder shown in FIG. 4 is used as the adder 1. The adder 101 in FIG. 4 is comprised of neuron MOS inverters 101A–101C made using neuron MOS (Metal Oxide Silicon) transistors and inverters 101D–101F.

The neuron MOS inverters 101A–101C are sequentially connected.

The output of the neuron MOS inverter 101A is connected to the of the neuron MOS inverter 101C and to the inverter 101F, the output of the neuron MOS inverter 101B is connected to the of the neuron MOS inverter 101C and to the inverter 101E, and the output of the neuron MOS inverter 101C is connected to the inverter 101D.

Data a4 and data a5 comprising 2 bits correspond to the data a1 and data a2 in FIG. 1. A digit of a number in the redundant number system is represented by data a4 and data a5. Data a4 and data a5 can not be implements using an electrical signal being transmitted on a single signal line. Accordingly, in order to implement data a4 and data a5 two signal lines are required.

In the third embodiment, "$-1^{SD}$" is implemented as "$00_B$", "$0_{SD}$" is implemented as "$10_B$" and "$1_{SD}$" is implemented as "$11_B$". With these implementations, processing is extremely simple for neuron MOS. That is, when the number of "1"s on the two signal lines is 0 is represented by "$-1_{SD}$", when the number of "1"s is 1 is represented by "0" and when the number of "1"s is 2 is represented by "$+1_{SD}$". The relationship between this information on the number of "1"s and the original SD number, and the number of "1"s can be simply calculated in the neuron MOS, by inputting respective signal lines to two equal capacity input terminals.

A threshold value is provided in the neuron MOS inverters 101A and 101B. The threshold values are provided so as to invert the output when addition results are "−0.5" and "1.5". By inverting respective outputs the carry signal c3 is output. The redundant number of the carry signal c3 and the code of the electrical signal are the same a data a4 and data a5. At the same time, the output of the neuron MOS inverter 101B is input to the neuron MOS inverter 101C. Also, s3 corresponding to the sum signal is output by the inverter 101D inverting the output of the neuron MOS transistor 101C. s3 corresponds to s1 in FIG. 1.

Figure 5:
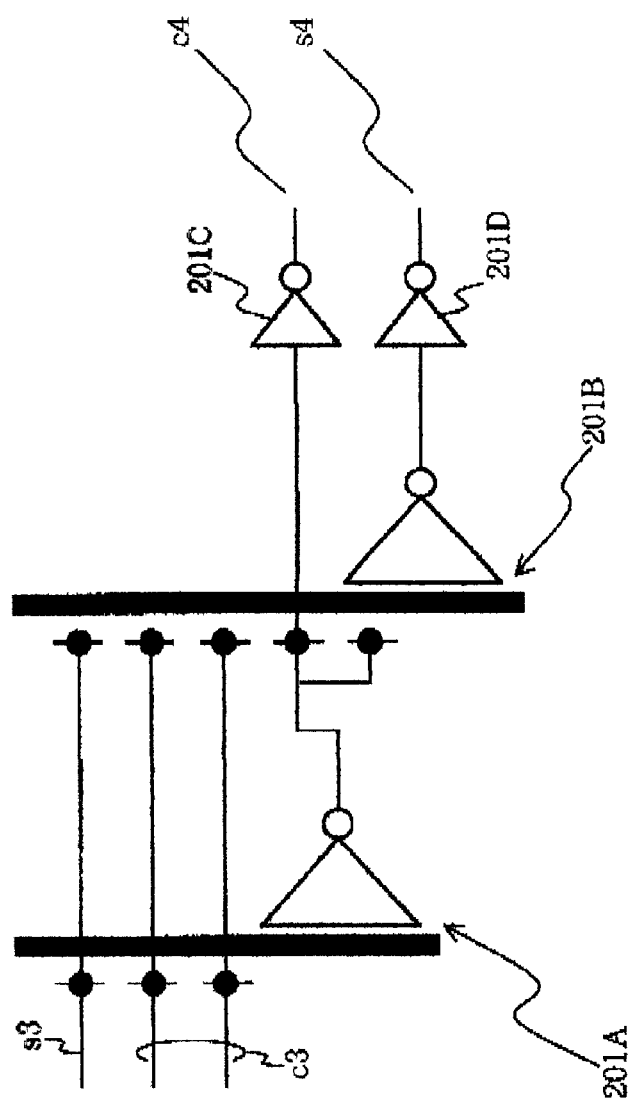
FIG. 5 is a circuit diagram of a next stage adder used in the third embodiment.

FIG. 5 is corresponds to the adder 2 in the first embodiment. The adder of FIG. 5 comprises neuron MOS inverters 201A and 201B. The neuron MOS inverters 201A and 201B are sequentially connected. The output of the neuron MOS inverter 201A is connected to the neuron MOS inverter 201B and the inverter 201C, and the output of the neuron MOS inverter 201B is connected to the inverter 201D.

An intermediate sum component s3 and a carry signal c3 from a previous stage counter are added. When an internal addition result is "−0.5", the output of the neuron MOS inverter 201A is inverted, and that output is inverted by the inverter 201C to output the carry signal c4. At the same time, the addition result component s4 is output by inputting the output of the neuron MOS inverter 201A to the neuron MOS inverter 201B. The addition result component s4 represents "−1" when at a low level and represents "0" when at a high level. c4 and s4 respectively correspond to c2 and s2 in FIG. 1.

The adder corresponding to the adder 3 in first embodiment is not required when using neutron MOS transistors. An intermediate sum component s4 from the adder 201 is delayed by one computing time unit by a delay element. The carry signal c4 and the delayed addition result component s4 are output as a pair. The delay element is the memory 4 of the first embodiment. This pair output corresponds to a3 in FIG. 1, and correspondence between the redundant number and the two signal lines is the same as the correspondence between a4 and a5.

In this way, if neuron MOS transistors are used it is possible to implement a circuit extremely easily. Also, it is not limited to binary SD numbers, and it is also possible to implement a redundant adder having one delay element (propagation of carry signal to one upper order digit) by using a redundant adder with an increased radix, using a redundant adder with an increased number of inputs, called a 4-input redundant adder or increasing the radix and the redundant number.

In the third embodiment, an inverter circuits is used as the basic gate for neuron MOS transistor computation, but it is possible to provide any threshold value and as long the output is in the format having binary "1"s and "0"s there is no limitation to an inverter circuit. For example, it is possible to use sense amplifier type logic circuits.

[Fourth Embodiment]

Figure 6:
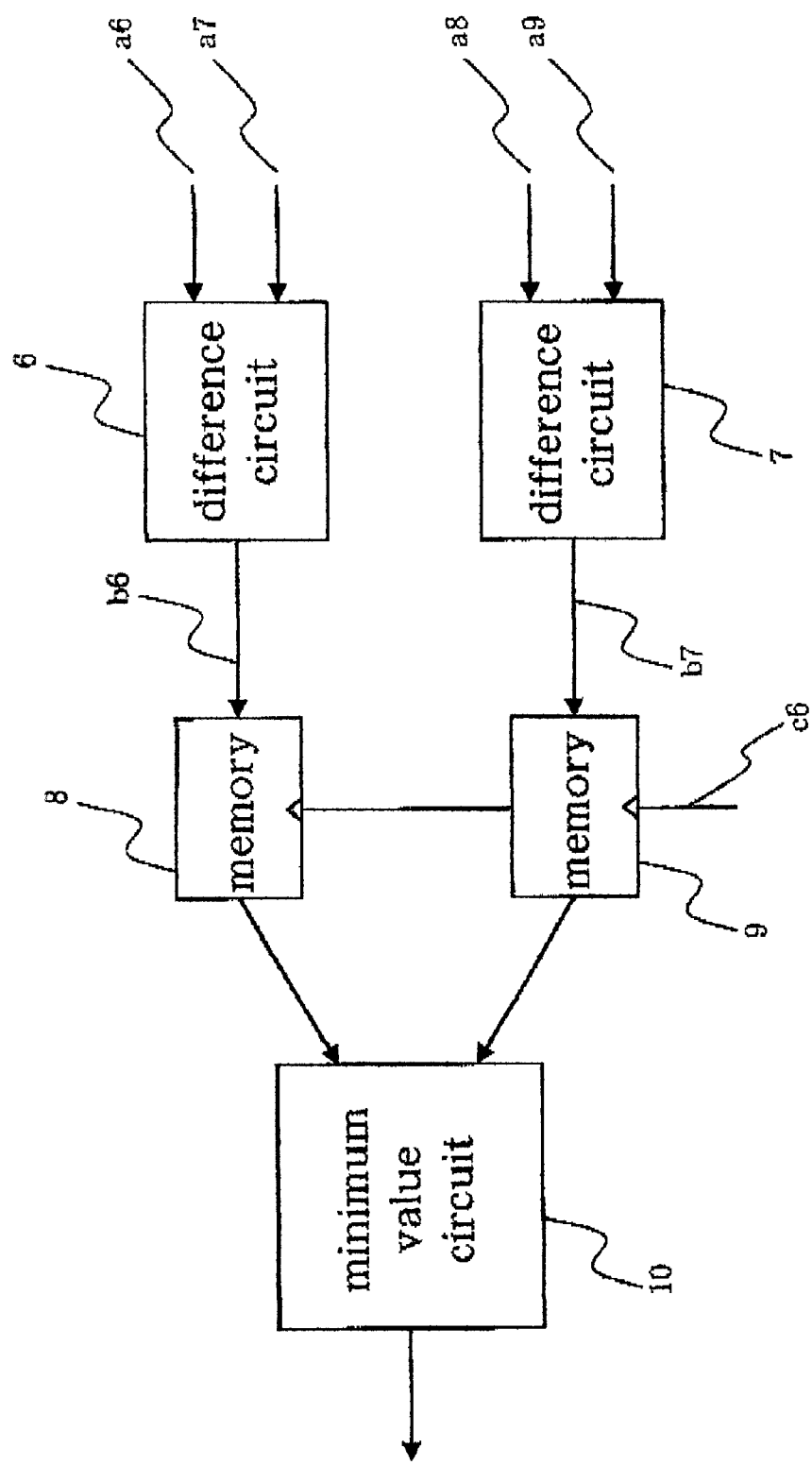
FIG. 6 is a block diagram of a semiconductor circuit for arithmetic processing of a fourth embodiment of the present invention.

The fourth embodiment is an application of the present invention to a semiconductor circuit for arithmetic processing that calculates and outputs the smaller of a difference between a first number and a second number, and a difference between a third number and a fourth number. This semiconductor circuit for arithmetic processing is shown in FIG. 6. The semiconductor circuit for arithmetic processing of FIG. 6 comprises difference absolute value circuits 6 and 7, memories 8 and 9, and a minimum value circuit 10.

Data a6 representing one digit of the first number and data a7 representing one digit of the second number are input to the difference circuit 6. The data a6 and the data a7 are sequentially input to the difference circuit 6 from the most significant digit. The difference circuit 6 calculates a difference between the input data a6 and data a7 and outputs a difference signal b6 representing the calculated difference to the memory 8.

Similarly, data a8 representing one digit of the third number and data a9 representing one digit of the fourth number are input to the difference circuit 7. The data a8 and the data a9 are sequentially input to the difference circuit 7 from the most significant digit. The difference circuit 7 calculates a difference between the input data a8 and data a9 and outputs a difference signal b7 representing the calculated difference to the memory 9.

The memories 8 and 9 are operated by a control clock c6. If D-type flip-flops, for example, are used as the memories 8 and 9, the memories 8 and 9 update stored contents using an edge trigger of the control signal c6. Specifically, the memories 8 and 9 output difference signals b6, b7 for the previous single computation time unit to the minimum value circuit 10.

The minimum value circuit 10 outputs a signal according to a size relationship of the difference signals b6 and b7 from the memories 8 and 9. Specifically, when the difference signal b6 is small compared to the difference signal b7, difference signal b6 is output. This condition is a first condition. When the difference signal b7 is small compared to the difference signal b6, the minimum value circuit 10 outputs the difference signal b7. This condition is a second condition. If difference signal b6 and difference signal b7 are the same, the minimum value circuit 10 can output either the difference signal b6 or the difference signal b7. This condition is a third condition.

Until a reset signal is supplied to the minimum value circuit 10, the minimum value circuit 10 does not change from the first condition or the second condition.

Operation of the fourth embodiment will now be described in the following.

The difference circuit 6 calculates a difference between data a6 and data a7, and the difference circuit 7 calculates a difference between data a8 and data a9. Calculation results are output as difference signals b6 and b7.

The difference signals b6 and b7 are input to the memories 8 and 9. AT this time, the stored contents are updates using the control clock c6. Output from the memories 8 and 9 is a difference result for an upper order digit, being the computation result for the previous time. Specifically, the memories 8 and 9 delay the difference signals b6 and b7 and operate to partition the digit information.

The memory 8 and the memory 9 output stored difference signal b6 and b7 to the minimum value circuit 10. The minimum value circuit 10 then selects the smaller value of the difference signal b6 and the difference signal b7, and outputs the selected difference signal.

After that, using the next pulse of the control signal c6 the digits of data a6–a9 are transferred, computation moves to one digit lower and computation progresses in the direction from the upper order digits to the lower order digits.

In this way, according to the fourth embodiment, it is possible to sequentially output the smaller difference value from the upper order digits. Normally, when determining a minimum value it is necessary to sequentially check from upper order digits within the digits making up the data. As a result, the fourth embodiment is suitable for computation from an upper order digit.

Also, by arranging different computing elements in multiple stages it is possible to implement combinations of complex computations.

This is one of the features of performing processing from an upper order digit. In the fourth embodiment, computation is in two stages, but it is also possible to have more than two stages.

Further, it is not always necessary to have memory for partitioning and storing digit information in each stage, they do not need to be provided in the output of the final stage.

[Fifth Embodiment]

Figure 7:
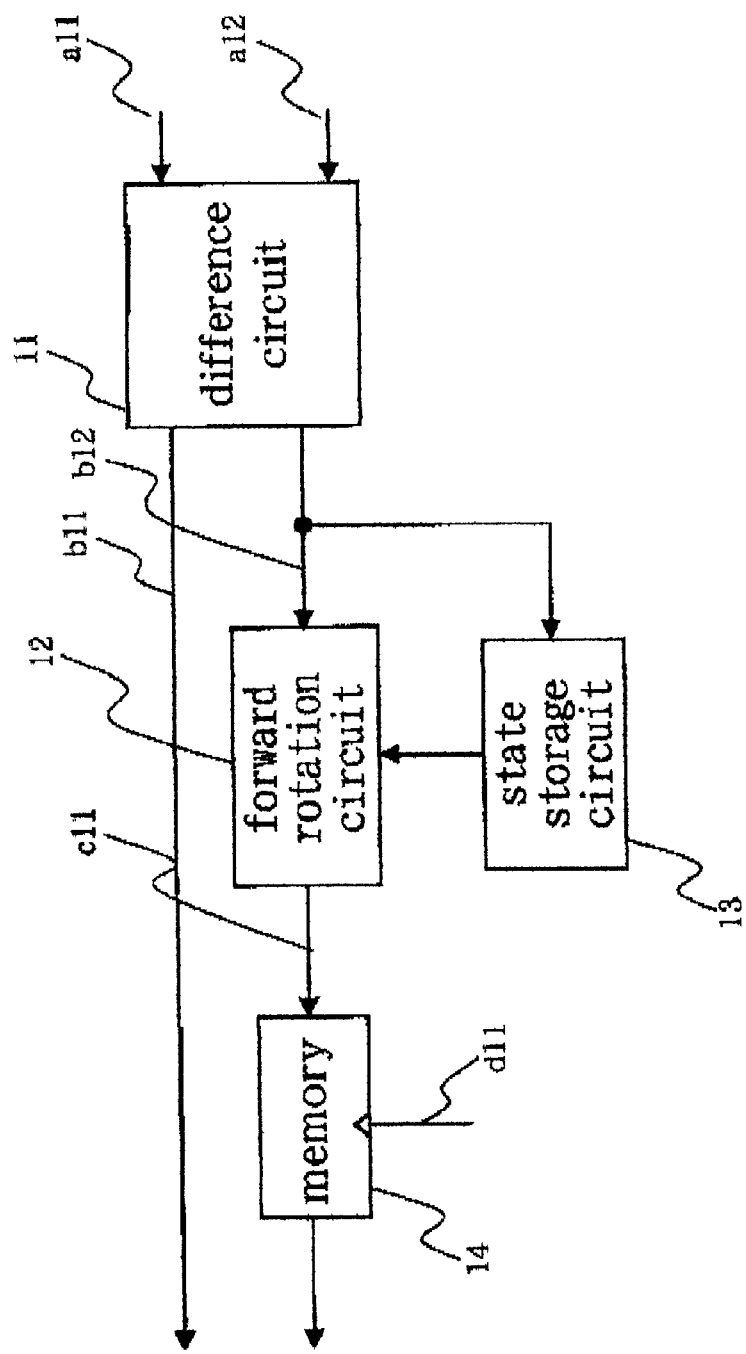
FIG. 7 is a block diagram of a semiconductor circuit for arithmetic processing of a fifth embodiment of the present invention.

In the fifth embodiment, this invention is applied to a semiconductor circuit for arithmetic processing for calculating an absolute value of a difference. This semiconductor circuit for arithmetic processing is shown in FIG. 7. The semiconductor circuit for arithmetic processing of FIG. 7 comprises a difference circuit 11, a forward and backward rotation circuit 12, a state storage circuit 13 and a memory 14.

Data a11 representing one digit of a first number and data a12 representing one digit of a second number are input to the difference circuit 11. The data a11 and a12 are sequentially input to the difference circuit 11 every computing time unit from the most significant digit of digits making up the data.

The difference circuit 11 subtracts the input data a12 from the input data a11. The difference circuit 11 then outputs a carry signal b11 generated by the difference calculation, and outputs a difference signal b12 represented the subtracted difference to the forward and backward rotation circuit 12 and the state memory 13.

The state memory 13 stores the state of the difference signal b12. There are three state in the difference calculation. A state where a decision as to which one of the data a11 or the data a12 is larger is entrusted to a lower order digit, a state where it has been decided that data a11 is larger, namely when the difference signal b12 is positive, and a state where it has been decided that the data a12 is larger, namely that the difference signal b12 is negative. Once it has been decided that one of the data is larger, that state is not removed until processing is completed. The state memory 13 stores these three states. When the state is that it has been decided that data a12 is larger, the state storage circuit outputs a rotate instruction to the forward and backward rotation circuit 12.

The forward and backward rotation circuit 12 obtains an absolute value of the value of the difference signal b12. In order to do this, the forward and backward rotation circuit 12 uses the state of the difference signal b12 stored in the state storage memory 13. Specifically, when the state is that data a12 is large, the difference signal b12 is negative, and so the forward and backward rotation circuit 12 rotates code representing the sign of each digit of the difference signal b12. The forward and backward rotation circuit 12 thus sequentially outputs an absolute value signal c11 representing the absolute value of the calculated difference signal b12 from an upper order digit.

The memory 14 is operated by a control circuit d11 and stores the absolute value signal from the forward rotation circuit.

Using this fifth embodiment, the absolute value signal c11 stored in the memory 14 is output at the next clock of the control signal d11. Specifically, the absolute value signal c11 is delayed by one computation time unit. In this way, a carry signal b11 generated by the difference circuit 11, and an absolute value signal c11 output by the memory 14 come to represent the same digit at the same time, and it is easy to handle using an external circuit.

[Sixth Embodiment]

Figure 8:
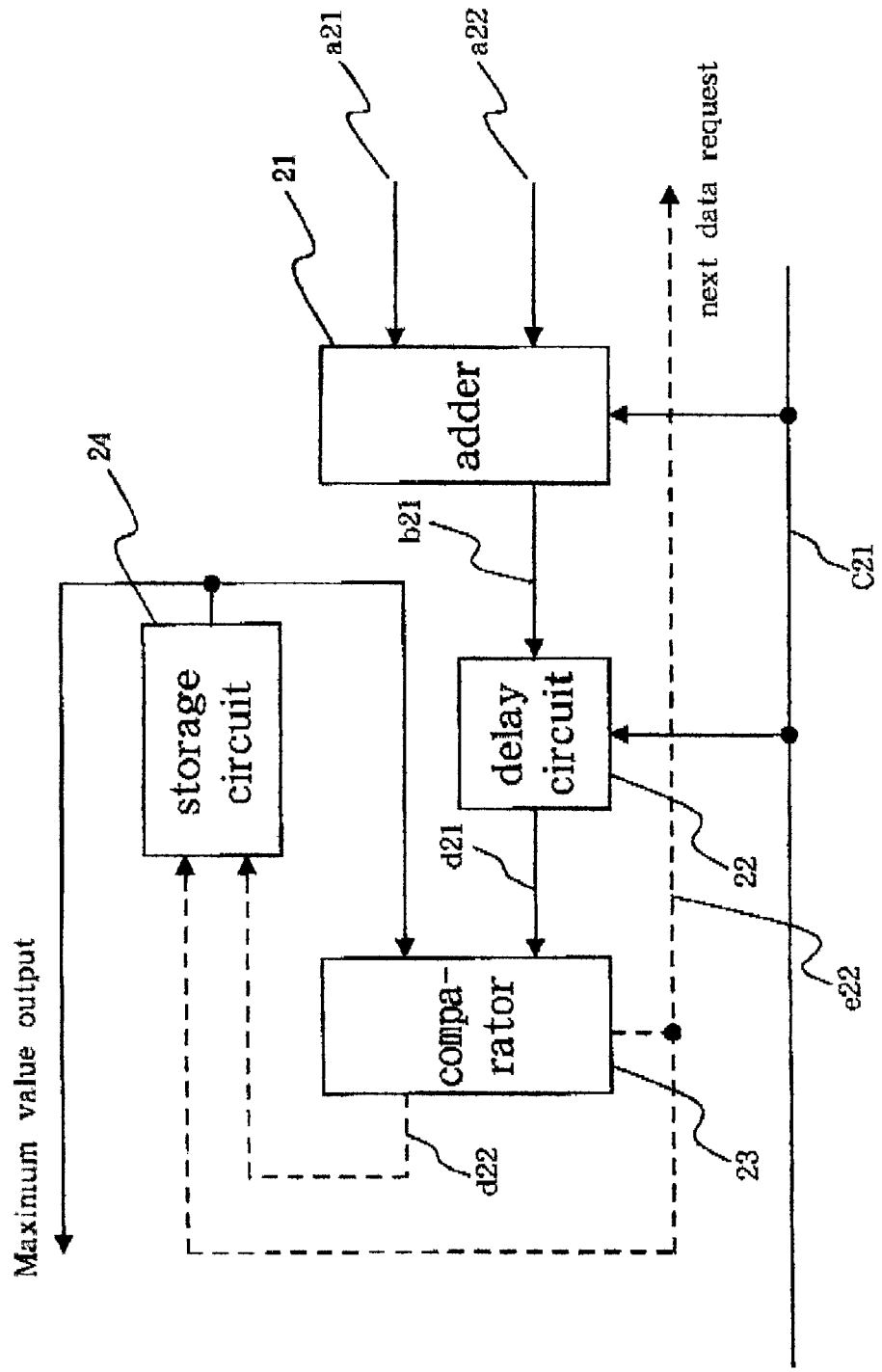
FIG. 8 is a block diagram of a semiconductor circuit for arithmetic processing of a sixth embodiment of the present invention.

In the sixth embodiment, the present invention is applied to a semiconductor circuit for arithmetic processing which carries out an arbitrary operation from an upper order digit, then compares and decides from an upper order digit, and omits arithmetic processing including comparison and decision for a remainder when authenticity has been defined. This semiconductor circuit for arithmetic processing is shown in FIG. 8. This semiconductor circuit for arithmetic processing is a circuit for finding out the maximum from among a plurality of sets based on an average value of two binary numbers, a delay circuit 22, a comparator 23 and a storage circuit 24.

Data a21 representing one digit of a first number and data a22 representing one digit of a second number are input to the adders 21. The data a21 and a22 are sequentially input to the adder 21 from the most significant digit. The adder 21 adds tho input data a21 and a22, and outputs a sum signal representing the addition result to the delay circuit 22. This adder is the circuit described in the first embodiment, and has internal delay means and does not generate a carry signal to the outside.

The delay circuit 22 receives the sum signal b21 from the adder 21 and delays the sum signal by one computation time unit using a control clock c21. When processing is performed from an upper order digit, the delay by one computation time unit is equivalent to a digit being delayed by one digit, specifically, to dividing a duodecimal number by two. Since the first data and the second data are binary numbers, delay by one digit is the same as dividing by two, as a result of which an average value is calculated. The delay circuit 22 outputs an average value signal d21 representing the average value to the comparator 23.

On the other hand, the storage circuit 24 stores a maximum average value signal d22 output by the comparator 23. Them when a control signal e22 from the comparator 23 is OFF the currently stored average value signal, namely an average value signal representing a maximum of past average values, is sequentially output from the most significant digit to the comparator 23. When the control signal e22 from the comparator 23 is ON, the storage circuit 24 suspends output, and carries out preparation so that from the next time a maximum average value is again output sequentially.

The comparator 23 receives the average value signal d21 from the delay circuit 22 and a past maximum average value signal from the storage circuit 24 sequentially from an upper order digit. The comparator compares a value representing the average value signal d21 from the delay circuit 22 and a value representing the past maximum average value signal From the storage circuit 24, and determines which is larger. The comparator 23 then outputs the larger average value signal to the memory circuit sequentially from an upper order digit.

When two average value signals are being compared, if the maximum value of average values from the past, namely a value representing an average value from the storage circuit 24, is larger, then there are cases where it is possible for the comparator 23 to make a decision. For example, according to the binary SD number system, an average value signal from the delay circuit being $[00\text{-}1 \ldots]_{SD}$ corresponds to a case of the average value signal from the storage circuit having being $[010 \ldots]_{SD}$. In this case, the comparator 23 can confirm the comparison decision at a point in time a certain number of digits from the nigh order. In this case the comparator 23 turns the control signal e22 ON.

At the point in time when the control signal e22 is turned ON, the comparator 23 stops comparison decision for subsequent lower order digits, which means that output of the average value signal by the storage circuit 24 is suspended and average value calculation and comparison computation are suspended. Data transfer for all computation circuits then returns to from the most significant digit, and the next digit data a21 and a22 are input.

Data are then sequentially compared from an upper order digit, the larger ones among the compared results are output and if the maximum value can not be updated computational processing including comparison of a digit having a comparison result and subsequent digits can be omitted. As a result, it is possible to realize computation that is not wasteful.

Also, by suppressing non-wasteful computation not only is it possible to speed up the processing, but it also becomes possible to realize a circuit having low power consumption. This is particularly effective when processing a large amount of data.

The type of computation is not limited to average values, and the type of comparison and decisional computation is not limited to maximums, and a circuit for performing comparison or decision for any kind of computational result is acceptable, for example a circuit for outputting a value equal to or less than a difference value between two numbers.

Also, after the instruction to suspend computation, it is necessary to have a data buffer before the data a21 and data a22 in order to rapidly input the subsequent data.

[Seventh Embodiment]

Figure 9:
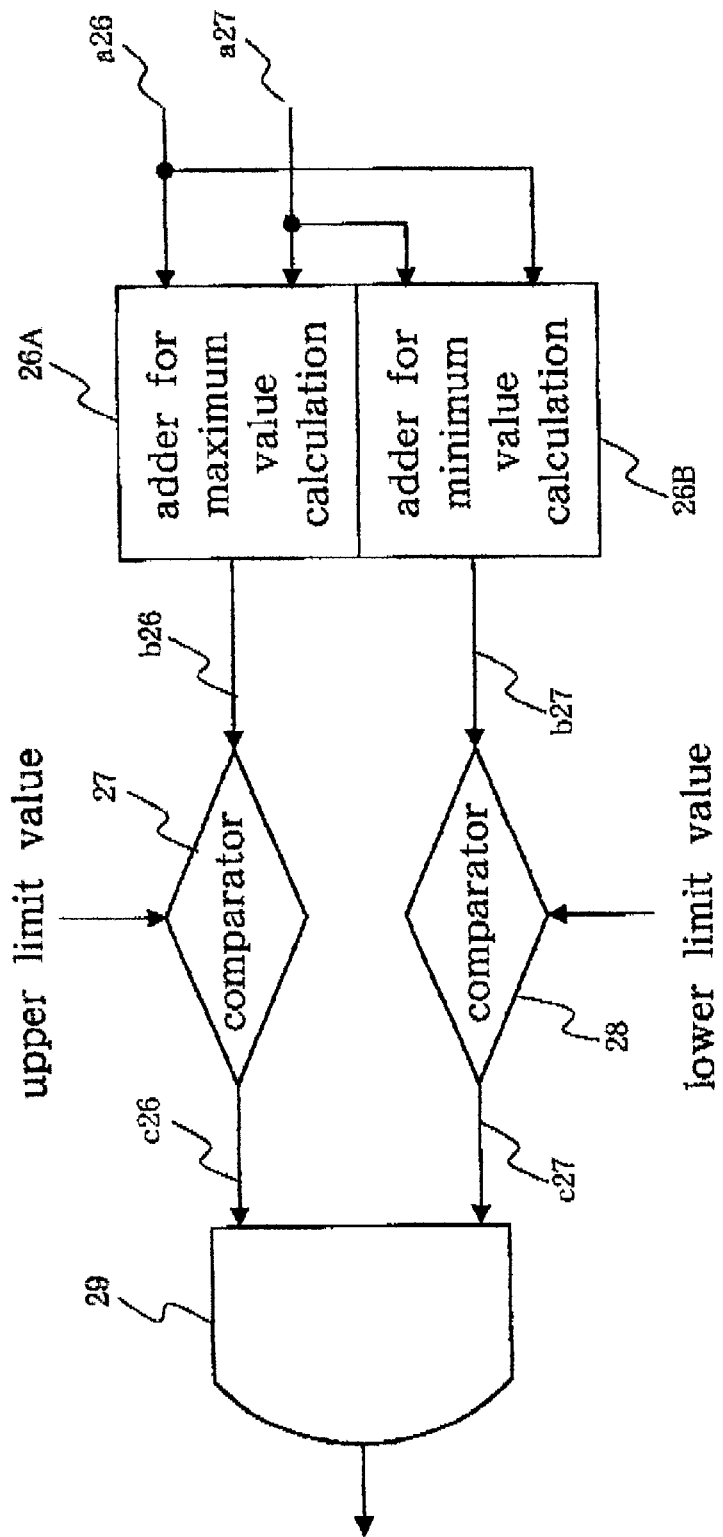
FIG. 9 is a block diagram of a semiconductor circuit for arithmetic processing of a seventh embodiment of the present invention.

With the seventh embodiment, the present invention is applied to a semiconductor circuit for arithmetic processing for computing a range of valises representing data and deciding whether or not the computed results are in a specified range, This semiconductor circuit for arithmetic processing is shown in FIG. 9. The semiconductor circuit for arithmetic processing of FIG. 9 comprises an adder 26A for outputting a maximum value, ar adder 26B for outputting a minimum value, comparators 27 and 28, and an AND gate 29.

The adder 26A for outputting a maximum value computes a maximum value, among values obtained using a lower order digit side, as a result of addition of data a26 and data a27 sequentially input from an upper order digit. The adder 26A then outputs a maximum value signal b26 representing the computed maximum value.

The adder 26B for outputting a minimum value computes a minimum value, among values obtained using a lower order digit side, as a result of addition of data a26 and data a27. The adder 26B then outputs a minimum value signal b27 representing the computed minimum value.

The comparator 27 compares a predetermined upper limit value with the maximum signal b26 output from the adder 26A. When the result of comparison is that the value represented by the maximum value signal b26 is small compared to the upper limit value, the comparator 27 outputs logical true to c26. When this is not the case, logical false is output to c26.

The comparator 28 compares a predetermined lower limit value with the minimum signal b27 output from the adder 26B. When the result of comparison is that the value represented by the minimum value signal b27 is large compared to the upper limit value, the comparator 27 outputs logical true to c27. When this is not the case, logical false is output to c27. When both c26 and c27 are true, the value becomes "1", while if either is false the value is "0".

The AND gate 29 computes a logical and of the output c26 from the comparator 27 and the output c27 from the comparator 28. When each of the comparators 27 and 28 output true, the AND gate 29 outputs true. Conversely, if either of the outputs c26 or c27 is false, the AND gate 29 outputs false.

Figure 10:
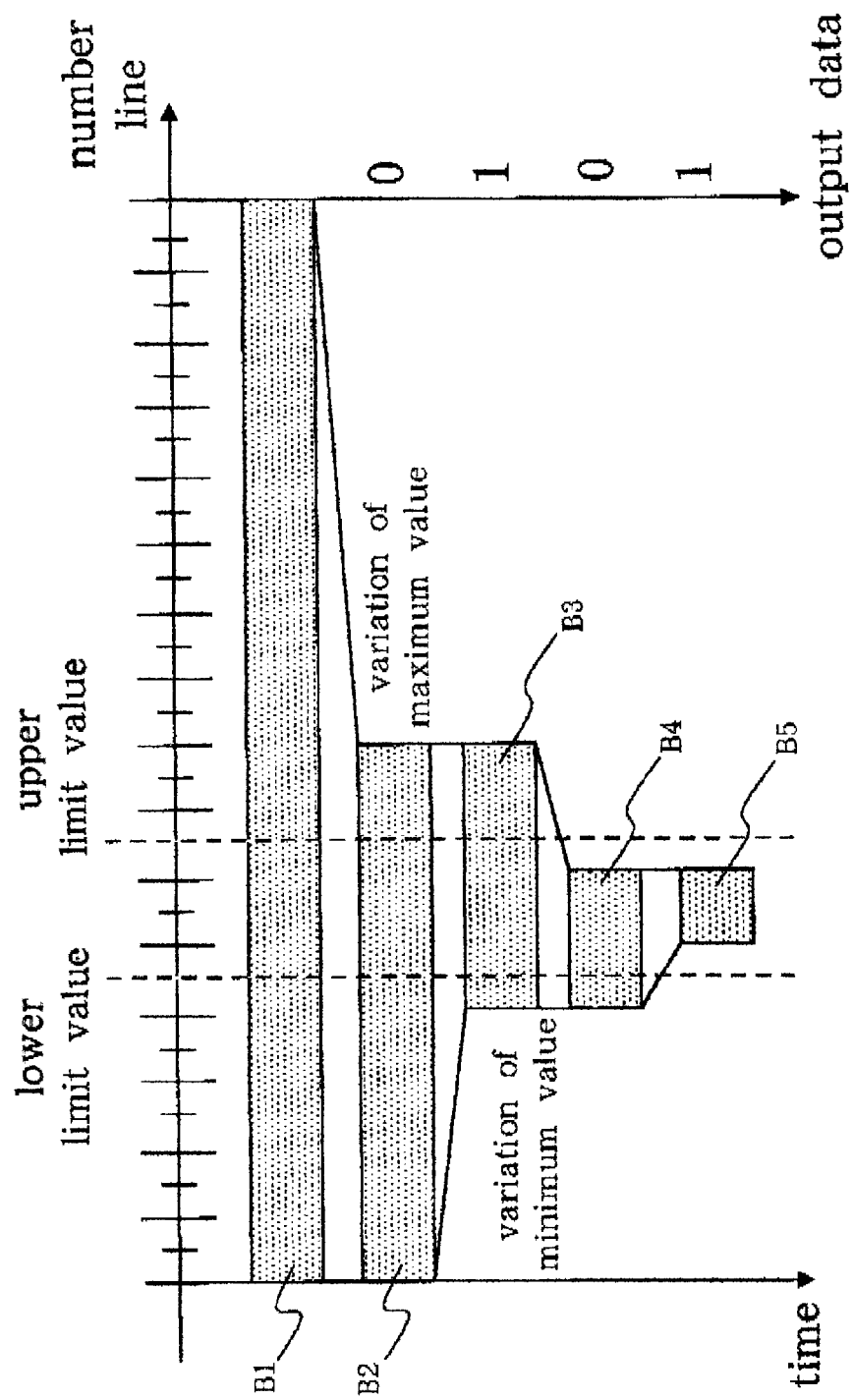
FIG. 10 is an explanatory drawing for describing how to search a range according to the seventh embodiment.

According to the seventh embodiment, as shown, for example, in FIG. 10, a decision is made as to whether or not an addition result is in a specified range. In FIG. 10, a binary number system is assumed. Specifically, in the initial state, there is a possibility that the range of the maximum value computed by the adder 26A and the minimum value computed by the adder 26B is the entire range B1. In the event that the computation result of the most significant digit is "0", a range that will be obtained using subsequent digits is from $[011 \ldots 11]_B$ to $[0000 \ldots 0]_B$. Accordingly, the range B2 is a section obtained within the addition result. In this case, both of the comparators 27 and 28 will be outputting false.

In the event that a computation result using data a26 and a27 for the next digit down is "1", the minimum value is updated to $[010 \ldots 0]$. In this case, the range B3 is a section obtained within the addition result.

In the event that a computation result using data a26 and a27 for the next digit down is "0", the maximum value is reduced to $[01011 \ldots 1]$. In this case, the range B4 is a section obtained within the addition result. At this time, the maximum value of range B4 is smaller than the upper limit value. Specifically, the comparator 27 outputs true. However, the comparator 28 outputs false, and so the overall output remains at false.

If the computation result using data a26 and a27 for the next digit down becomes "1" like the range B5, the minimum value becomes larger than the upper limit value. As a result, it will be known that the range B5 is in a specified range determined by the upper limit value and tile lower limit value, without computing subsequent lower order digits. In this case, both of the comparators 27 and 28 output true, and so the output of the AND gate 29 is also true.

In this way, using seventh embodiment, it is possible to detect whether or not a result of addition of data a26 and data a27 lies within a specified range.

With the seventh embodiment, the adders 26A and 26B are used, but any computation is possible if there is a circuit structure capable of detecting a maximum value and a minimum value.

Also, as the comparison computation, it is possible to only compare with an upper limit value, or to only compare with a lower limit value.

Further, although not shown in the drawings, it is also possible to detect whether or not data is within a specified range by carrying out a comparison between the upper limit value and the minimum value, or carrying out a comparison between the lower limit value and the maximum value.

[Eighth Embodiment]

Figure 11:
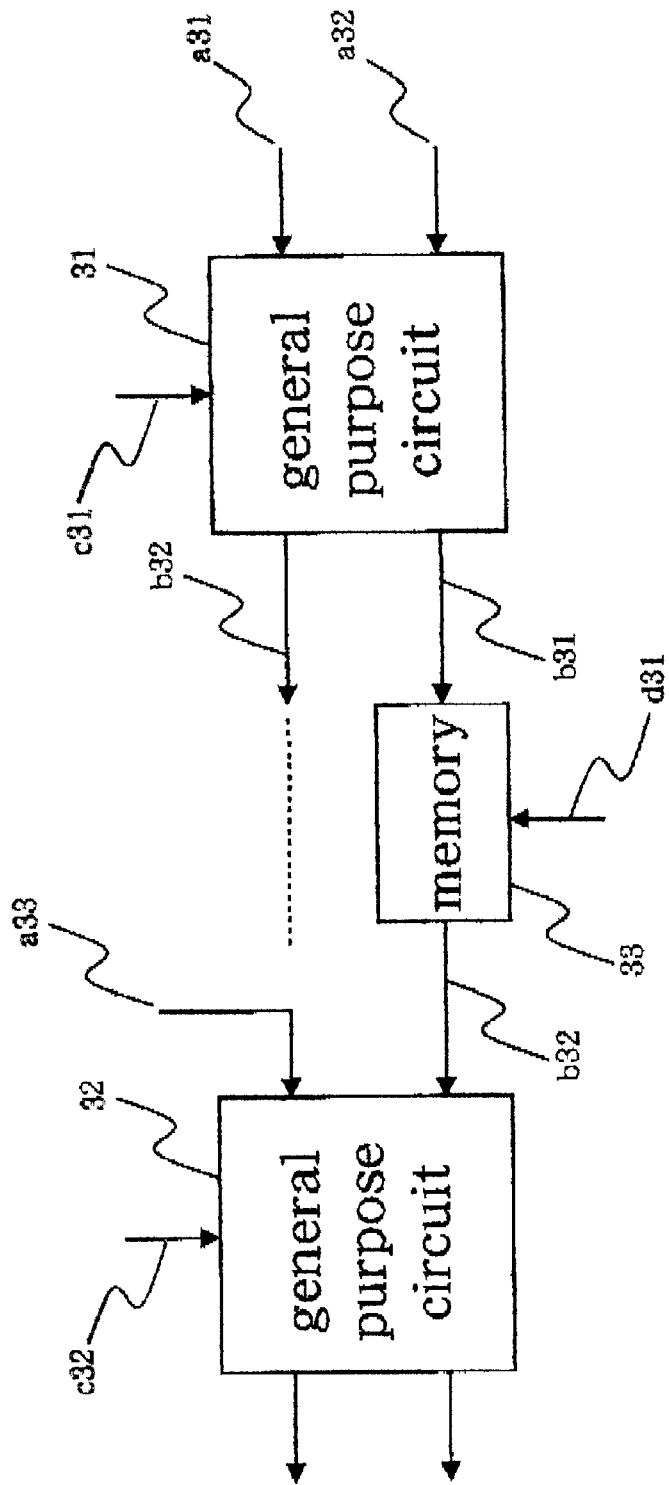
FIG. 11 is a block diagram of a semiconductor circuit for arithmetic processing of a eighth embodiment of the present invention.

With the eighth embodiment, the present invention is applied to a semiconductor circuit for arithmetic processing capable of switching between computing functions. This semiconductor circuit for arithmetic processing is shown in FIG. 11. The semiconductor circuit for arithmetic processing shown in FIG. 11 comprises general purpose circuits 31 and 32 capable of processing from an upper order digit, and a memory 33.

The general purpose circuit 31 is a circuit having a plurality of functions that can be processed sequentially from upper order digits, such as an addition function from an upper order digit or a comparison function from an upper order digit. One function among the plurality of functions is selected using an instruction represented by the control signal c31. The general purpose circuit 31 processes input data a31 and a32 using the selected computation function. After processing, the general purpose circuit 31 outputs data b31 representing a computation result to the memory 33. The general purpose circuit 31 also out puts the control signal b32 for an upper order digit, as required.

The general purpose circuit 32, similarly to the general purpose circuit 31 is a circuit having a plurality of functions to be processed sequentially from upper order digits, such as an addition function or a comparison function. The general purpose circuit 32 selects one function from among the plurality of functions using an instruction represented by the control signal c32. The general purpose circuit 32 processes input data a33 and data b32 from the memory 33 using the selected function.

The memory 33 delays the data b31 from the general purpose circuit 31 by a single computation time unit using a control clock d31. The memory 33 then outputs the delayed data b32 to the general purpose circuit 32.

According to this eighth embodiment, it is possible to control a computation function using control signal c31 and c32, and it is possible to output a response according to an instruction representing by the control signals c31 and c32. That is, by supplying the control signals c31 and c32, it is possible to set any computation function.

The eighth embodiment is made up of two general purpose circuits and a single memory, but the number of general purpose circuits and memories, or the combinations thereof, are not limited.

Also, a general purpose circuit can be realized by preparing a circuit for carrying out each function, and can be realized with flexware using neuron MOS transistors, but the general purpose circuit is not especially limited.

Further, the control signals c31 and c32 can be the same or different. For example, continuous computation where control signal c31 represents an addition instruction and control signal c32 represents a comparison instruction is possible, and also an instruction for computing consecutive digits by making c31 and c32 both addition instructions is also possible.

[Ninth Embodiment]

Figure 12:
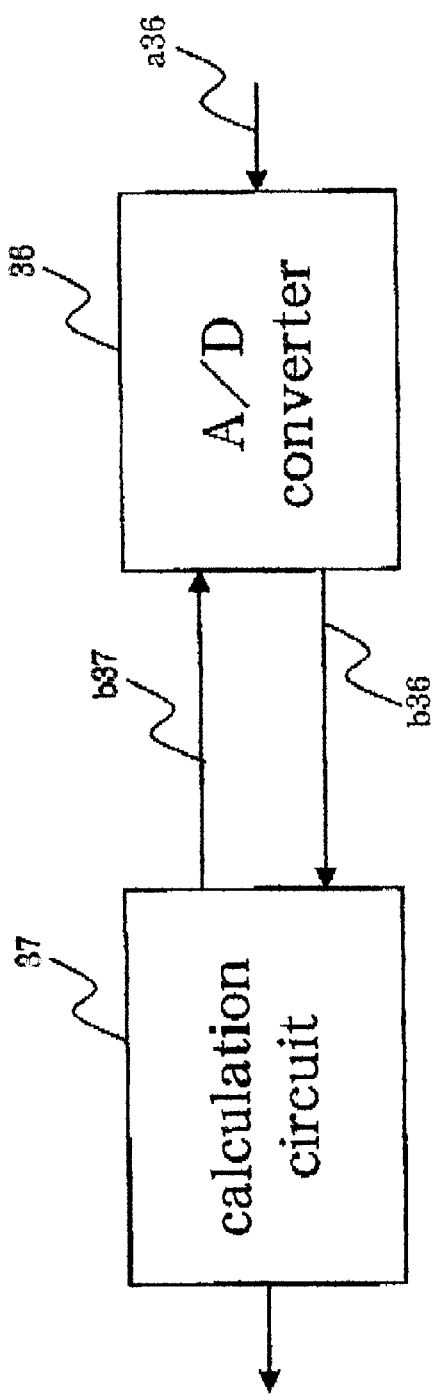
FIG. 12 is a block diagram of a semiconductor circuit for arithmetic processing of a ninth embodiment of the present invention.

In the ninth embodiment, the present invention is applied to a semiconductor circuit for arithmetic processing that carries out data processing after analog to digital (A/D) conversion of an analog signal sequentially from an upper order digit, referred to generally as a successive approximation method. This semiconductor circuit for arithmetic processing is shown in FIG. 12. The semiconductor circuit for arithmetic processing of FIG. 12 comprises an A/D converter 36 and a computing circuit 37.

The A/D conversion circuit 36 is means for converting an analog signal to a digital signal. The A/D conversion circuit 36 sequentially converts to a digital signal from an upper order digit using a conversion method generally referred to as the successive approximation method. For example, in the case of a binary number, the entire number is partitioned into two regions, and it is determined which region an input analog voltage belongs to. If the result of determination is on the high voltage side "1" is output, while if it is or the low voltage side "0" is output. Next, the region that the analog voltage belongs to is further divided into two regions, and it is determined which region the analog voltage belongs to. Similarly, if it belongs in the high voltage side region "1" is output, while if it belongs in the low voltage side region "0" is output. By repeating these divisions and decisions, and making the range of the region in which the input analog voltage belongs successively narrower, sequential conversion is carried from the upper order digit. The division and decision are performed every computing time unit.

Figure 13:
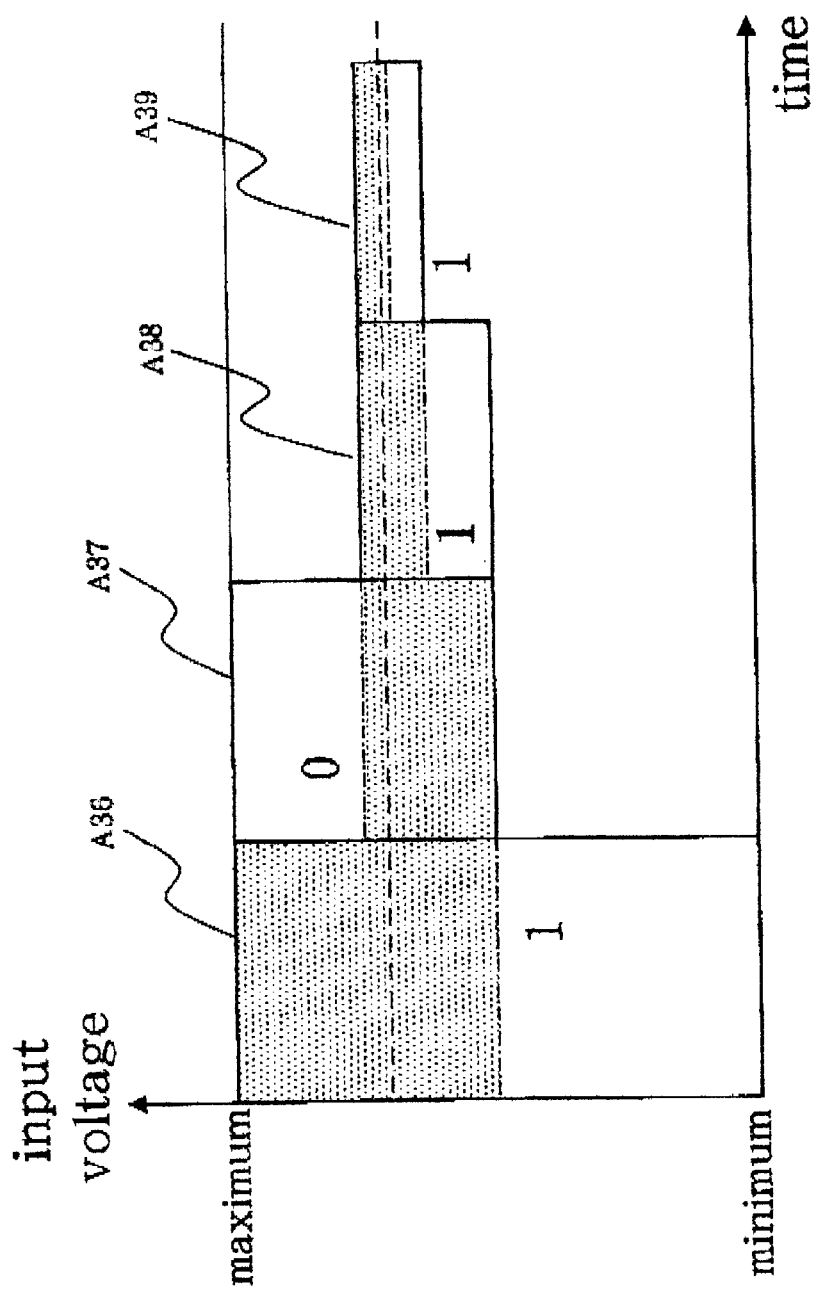
FIG. 13 is an explanatory drawing describing an A/D conversion operation of the ninth embodiment.

Conversion elements of the A/D converter 36 will be described in detail using FIG. 13. The voltage level of an analog signal a36 input to the A/D converter 36 (hereinafter referred to as the input voltage) is the level shown by the dotted line. Initially, the A/D converter decides whether the input voltage s larger or smaller than half the maximum amplitude. In this case, the full range A36 of the maximum amplitude is divided into two smaller ranges, and it is determined whether the input voltage is in the minimum side half range or the maximum side half range. In this case, the input voltage is in the maximum side half range, and so the A/D converter 36 outputs a digital signal b36 with a first bit of "1".

After the next computing time unit, the maximum side half range A37 is further divided into two quarter ranges, and it is determined whether the input voltage is in the minimum side quarter range or the maximum side quarter range. In this case, the input voltage is in the minimum side quarter range and so the A/D converter 36 outputs the digital signal b36 having the second bit of "0". Subsequently, in the same manner, the A/D converter 36 outputs a result "1" for the third bit in the quarter range A38, and outputs a result "1" for the fourth bit in the eighth range A39 every computing time unit.

In this way, the A/D converter narrows the voltage range and converts the analog signal a36 to a digital signal b36. At this time, the A/D converter 36 outputs conversion results sequentially from the upper order digit. This type of A/D conversion is already known, but a feature of this patent is that the computation circuit 37 matches from the upper order digit and this conversion is synchronized with this computation circuit 37.

Also, if the A/D converter 36 receives the control signal b37 from the computing circuit 37 A/D conversion of the analog signal 36a from the upper order digit is suspended.

If the computing circuit 37 receives the digital signal 36b output from the A/D converter 36, computing set in advance is carried out for the digital signal b36. If the computing circuit 37 then determines that there is no need to convert the analog signal a36 to the digital signal b36, based on the computational result, a control signal b37 representing suspension of conversion is output to the A/D converter 36. Determination that conversion is not required will be the result when, for example, the conversion precision required by the A/D converter has been obtained at that time, or when the authenticity of any determination stage is confirmed.

According to the ninth embodiment, by returning the control signal b37 to the A/D converter 36 analog to digital conversion is suspended midway through, and it is possible to input the next analog signal. As a result, wasteful conversion is curtailed, the average conversion rate is improved and there is the advantage that power consumption is reduced.

In the ninth embodiment, the voltage range is narrowed by half in order to obtain an output per bit (binary number) as a digital signal b36, but in the case of output per plurality of bits, it is possible to divide the voltage range by $\frac{1}{2}^N$ and make a decision as to which range the analog signal is in order to obtain output every N bits.

[Tenth Embodiment]

Figure 14:
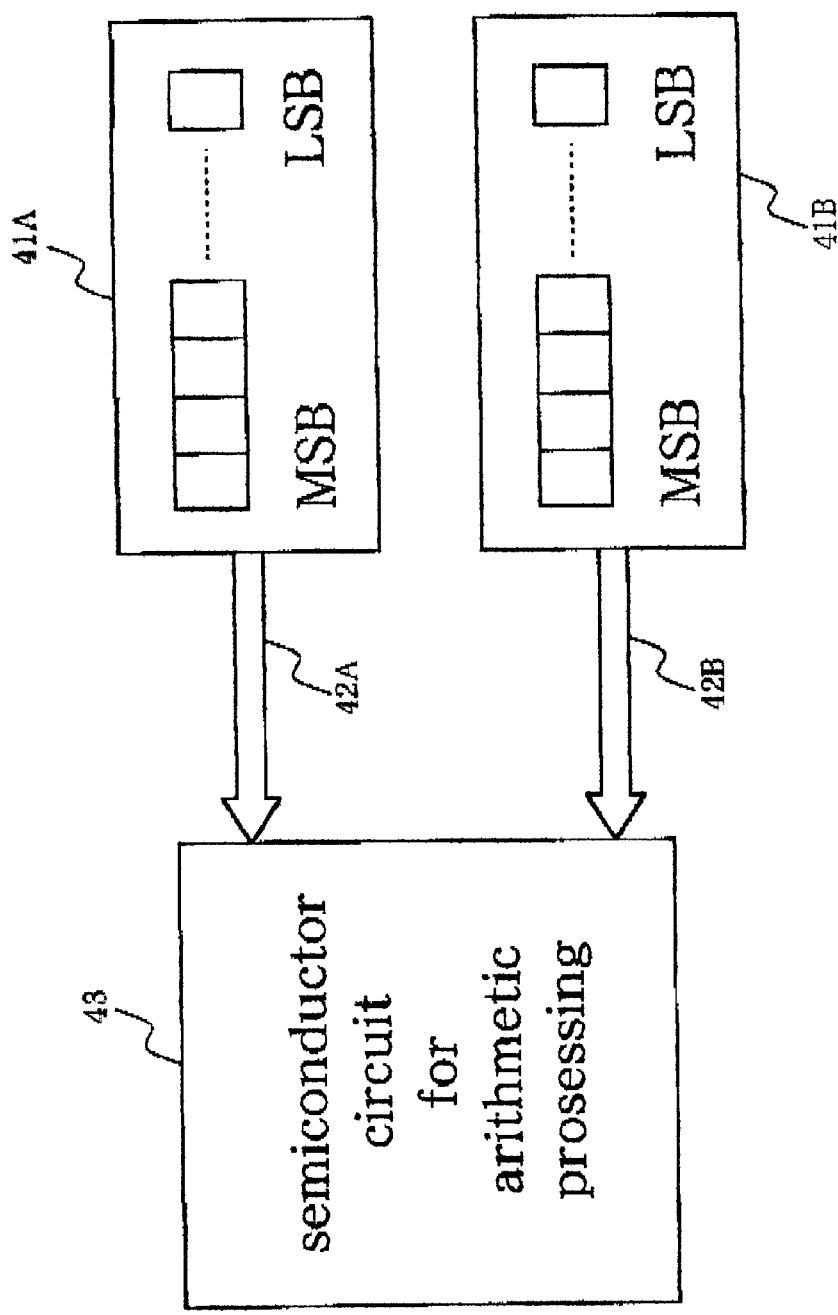
FIG. 14 is an explanatory drawing for describing a tenth embodiment of the present invention.

In the tenth embodiment, the present invention is applied to a semiconductor circuit for arithmetic processing using a bus that can transmit data having a flexible bit width. This semiconductor circuit for arithmetic processing will be described using FIG. 14. In FIG. 14, memories 41A and 41B are bit-sequential memories. Specifically, the memories 41A and 41B store a plurality of data items, and the data are output to a data buses 42A and 42B every digit of a computation unit. At this time, the memories 41A and 41B sequentially output data every digit from upper order digits to lower order digits. That is, for a binary number, the memories 41A and 41B have such a structure that stored data is output sequentially one bit at a time from upper order bits to lower order bits. The memories 41A and 41B can be made of, for example, shift registers.

A semiconductor circuit for arithmetic processing 43 that is connected to the memories 41A and 41B through data buses 42A and 42B is a computing circuit or computing unit for sequentially processing data from the upper order digits.

The data buses 42A and 42B are preferably 1 bit wide per one data item. Specifically, the bus width of the data buses 42A and 42B corresponds to the number of data items simultaneously read out from the memories 41A and 41B (=degree of parallelism).

In this way, compared to a conventional bus width which is the data bit width or a multiple of the data bit width, according to the tenth embodiment the overall bus width can be made the number of data items simultaneously read out from the memories 41A and 41B.

With the tenth embodiment, a description has been given where a single bit unit has been adopted as the computation unit, but it goes without saying that the present invention is not limited to this and can adopt two or more bits as the computation unit.

Also, a single circuit is used as the semiconductor circuit for arithmetic processing 43, but it does not especially have to be a single circuit as long as it is a semiconductor circuit for arithmetic processing for processing sequentially from an upper order digit.

[Eleventh Embodiment]

Figure 15:
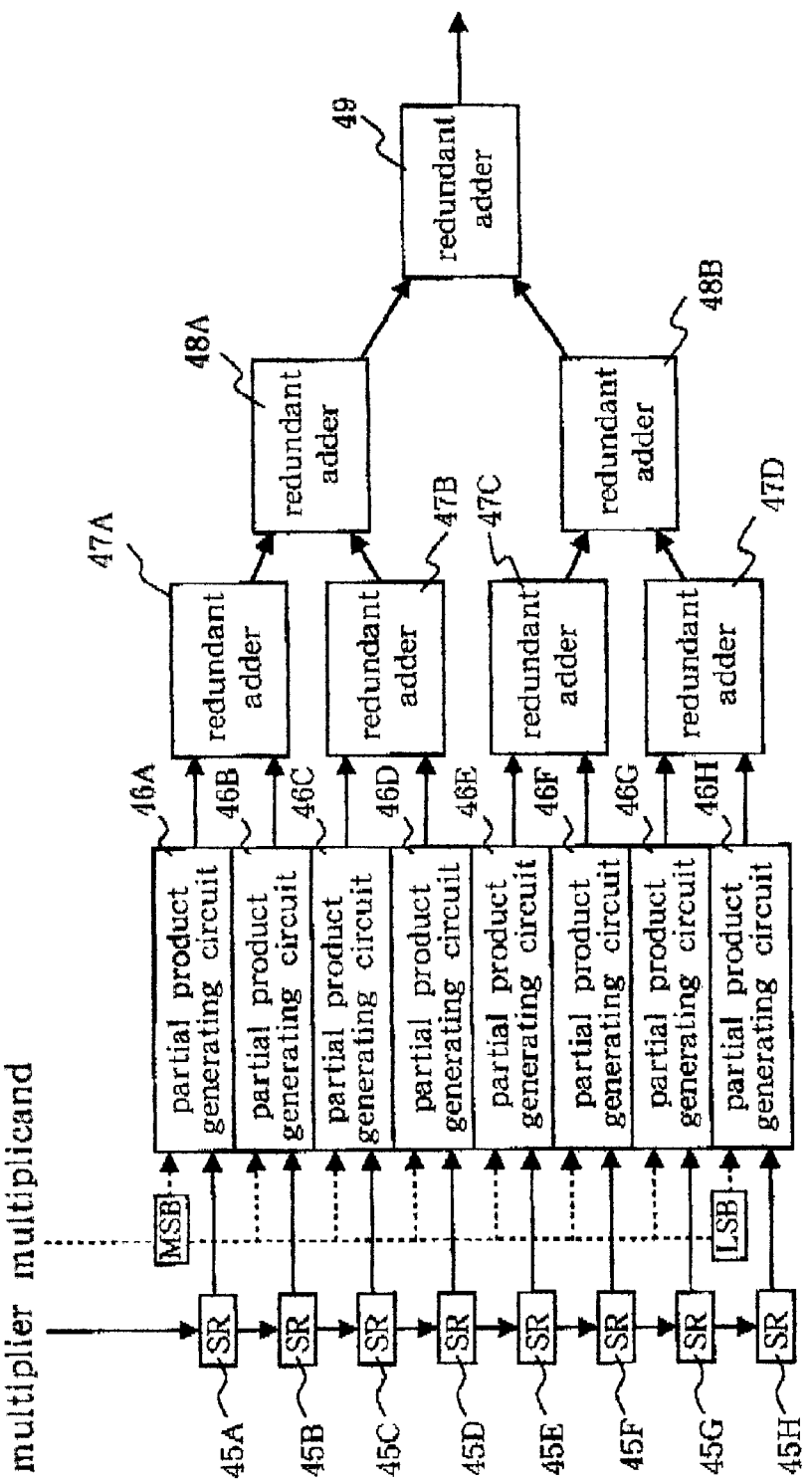
FIG. 15 a block diagram of a semiconductor circuit for arithmetic processing of an eleventh embodiment of the present invention.

In the eleventh embodiment, the present invention is applied to a semiconductor circuit for arithmetic processing for carrying out multiplication from an upper order digit using addition from the upper order digit. This semiconductor circuit for arithmetic processing is shown in FIG. 15. The semiconductor circuit for arithmetic processing of FIG. 15 comprises shift registers 45A–45H, partial product generating circuits 46A–46H, and redundant adders 47A–47D, 48A, 48B and 49.

The shift registers 45A–45H are together assumed to constitute as 8 bit multiplier, and are located at 8 places. On a clock edge, data input from an upper order byte are sequentially shifted so that the contents of shift register 45G are shifted into shift register 45H, the contents of shift register 45F are shifted into shift register 45G, the contents of shift register 45E are shifted into shift register 45F, and so on, and multiplier information for a new digit is input to shift register 45A This data is sequentially input from the most significant digit of data representing the multiplier to the shift register 45A. The shift registers 45A–45H output the stored multiplier data to the partial product generating circuits 46A–46H. For example, in the initial step the most significant digit of multiplier data is input to the shift register 45A, and data is output to the partial product generating circuit 46A. "0" is stored in the remaining shift registers 45B–45H. In the next step, the most significant digit is stored in shift register 45B, data of the second digit from the most significant digit is stored in shift register 45A, and the data are respectively output to the partial product generating circuits 46A–46B.

The partial product generating circuits 46A–46H are a times partial product generating circuits for 8 bit multiplication, and compute partial products of a multiplier output from the shift registers 45A to 45H, and a multiplicand having all bits input at the same time. The multiplicand is arranged so that the most significant digit is input to 46a and the least significant digit is input to 46H. Then, the partial product generating circuits 46A–46H output the partial products of the same digit in the multiplication to the adding circuits sequentially from the most significant digit.

The redundant adders 47A–47D, 48A, 48B and 49 are connected in a tree-like configuration. With this tree-like connection, the redundant adders 47A–47D, 48A, 48B and 49 add the partial products generated by the partial product generating circuits 46A–46H and output a single multiplication result sequentially from the upper order digit using the final redundant adder 49.

Figure 16:
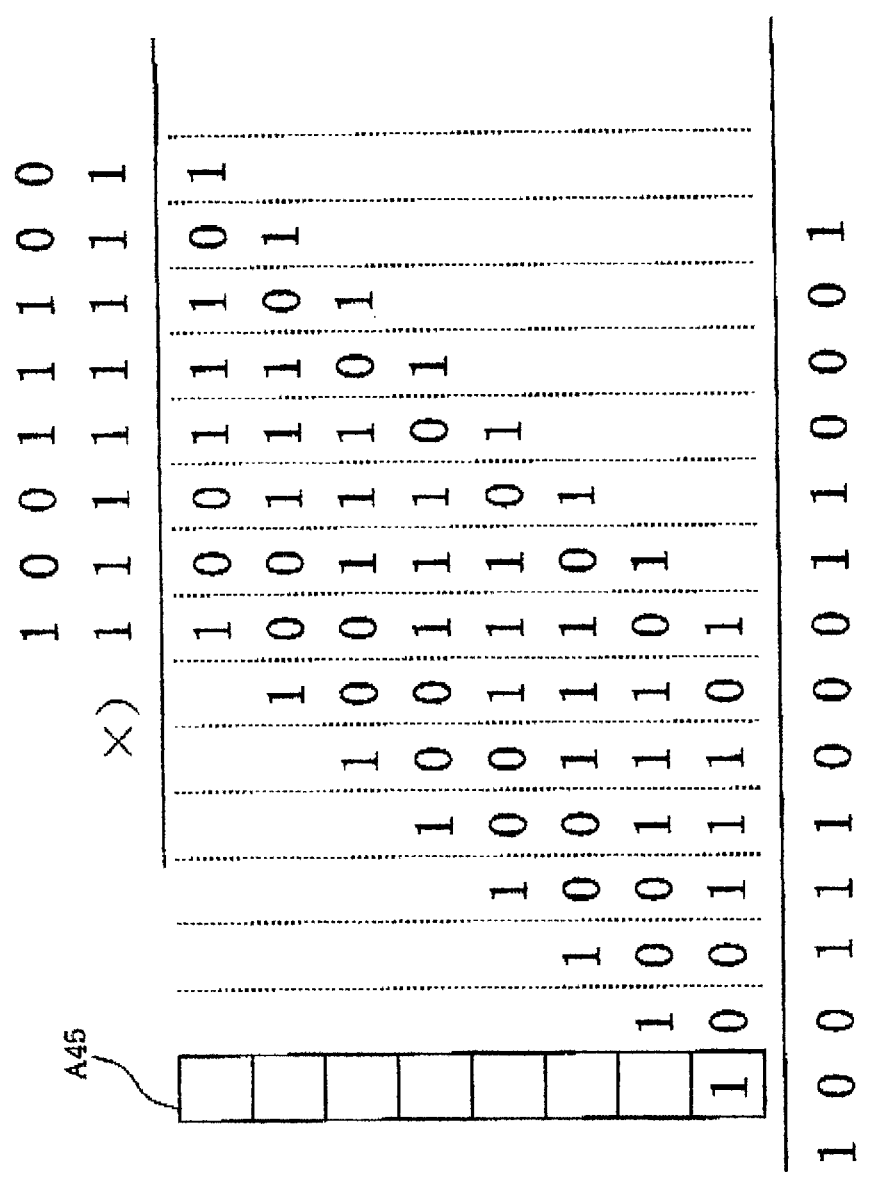

With this type of structure, as shown in FIG. 16, multiplication is implemented by expanding multiplication as if it were worked out on paper and generating and adding a string of partial products with the partial products to be added being vertically separated. In FIG. 16, the range of the vertically divided partial products is shown as range A45. From the partial product generating circuits 46A–46H a number input to eight frames inside the range A45 are output at the same clock. The range A45 is transferred to the lower order digit (to the right in FIG. 16) every single step (computation time unit), and partial products for one lower order digit are sequentially generated from the upper order digits to the lower order digits. Using the redundant adders 47A–47D, 48A, 48B and 49, partial products from the upper order digit generated by the partial product generating circuits 46A–46H are added up, and it is thus possible to obtain a multiplication result from the upper order digit.

In this way, according to the eleventh embodiment, by adding from the upper order digit it is possible to carry out multiplication from the upper order digit.

In the eleventh embodiment, for simplicity, 8 partial products are generated for multiplication in 8 bit units, but it is possible to the number of partial products generated at the same time using a generally used booth decoder.

Also, two-input single-output type adders have been used as the redundant adders 47A–47D, 48A, 48B and 49, but any adder that can carry out addition from the upper order digits is permissible, for example a four-input single-output redundant adder or the like.

Further, in the eleventh embodiment an 8-bit multiplier has been exemplified, but the present invention is by no means limited to 8-bits, and 16-bit or any other number of bits are possible. In the case of 16-bit multiplication, as a general rule, 16 partial products will be generated.

[Twelfth Embodiment]

Figure 17:
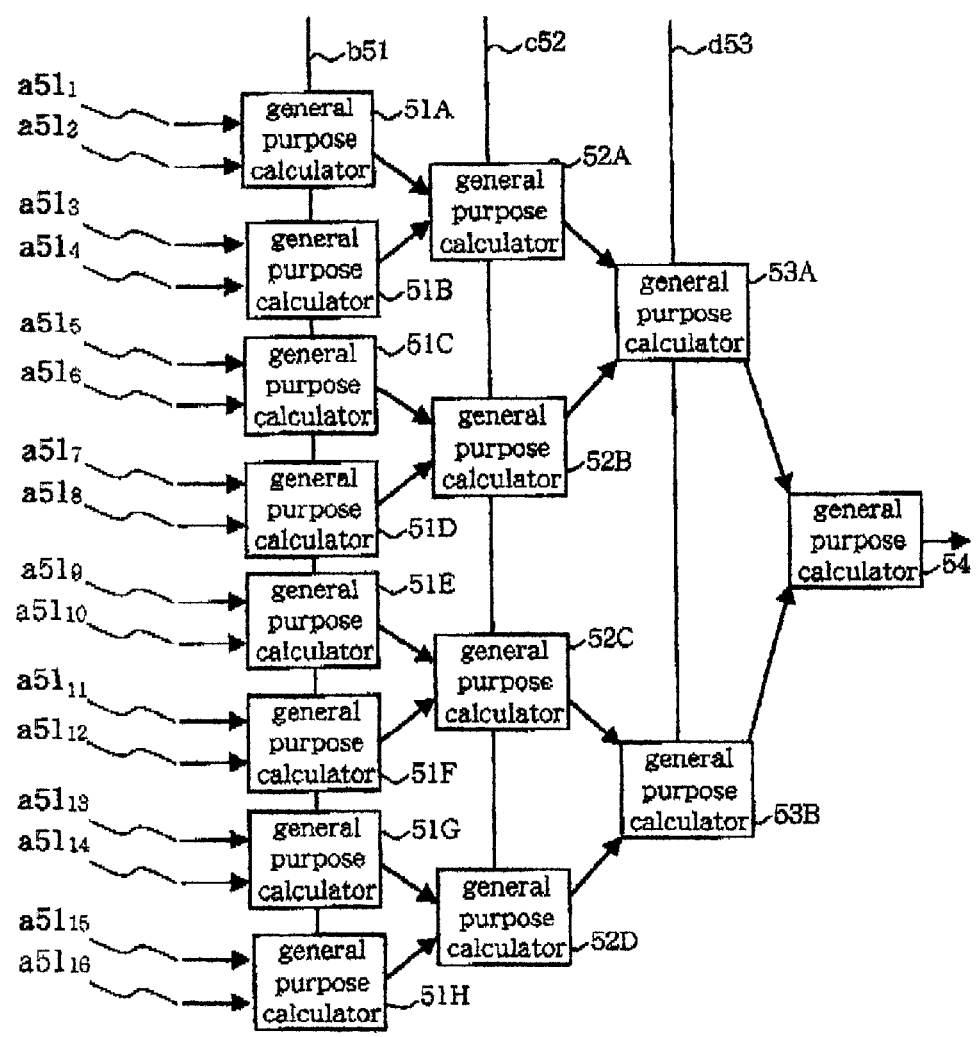
FIG. 17 a block diagram of a semiconductor circuit for arithmetic processing of an twelfth embodiment of the present invention.

The twelfth embodiment is a modified example of the eleventh embodiment. In the twelfth embodiment the present invention is applied to a semiconductor circuit for arithmetic processing for carrying out information aggregating processing besides multiplication, such as retrieval. This semiconductor circuit for arithmetic processing is shown in FIG. 17. The semi conductor circuit for arithmetic processing of FIG. 17 comprises general purpose functional units 51A–51H, 52A–52D, 53A, 53B and 54.

With the twelfth embodiment, the general purpose functional units 51A–51H, 52A–52D, 53A, 53B and 54 are connected in a tree configuration. The general purpose functional units 51A–51H are controlled by a control instruction b51, and the general purpose functional units 52A–52D are controlled by a control instruction c52. The general purpose functional units 53A and 53B are controlled by a control instruction d53.

For example, the general purpose functional units 51A–51H perform computation processing designated by the control instruction b51 on data $a51_1$–$a51_{16}$. Specifically, if the general purpose Functional units 51A–51H, 52A–52D, 53A, 53B and 54 have a function of performing addition from an upper order digit, they will achieve the same function as the eleventh embodiment. If the general purpose functional units 51A–51H, 52A–52D, 53A, 53B and 54 are circuits for outputting a maximum value from an upper order digit, a maximum value is output from the general purpose functional unit 54.

In this way, according to the twelfth embodiment information narrowing and information aggregation are carried out, and in this way it is possible to narrow down a lot of information to a single information item. That is, processing for other information aggregation besides multiplication, such as retrieval, becomes possible. Also, since, due to the principal of computing from the upper order digit, the general purpose functional units 51A–51H, 52A–52D, 53A, 53B and 54 can carry out processing for a single digit, it is possible to miniaturize the circuitry, and it is also possible to improve the degree of parallelism in the circuit overall.

With the twelfth embodiment, 16-input circuits have been described, but 16 inputs are not strictly necessary and it possible to have, for example, 8 inputs or 32 inputs.

[Thirteenth Embodiment]

Figure 18:
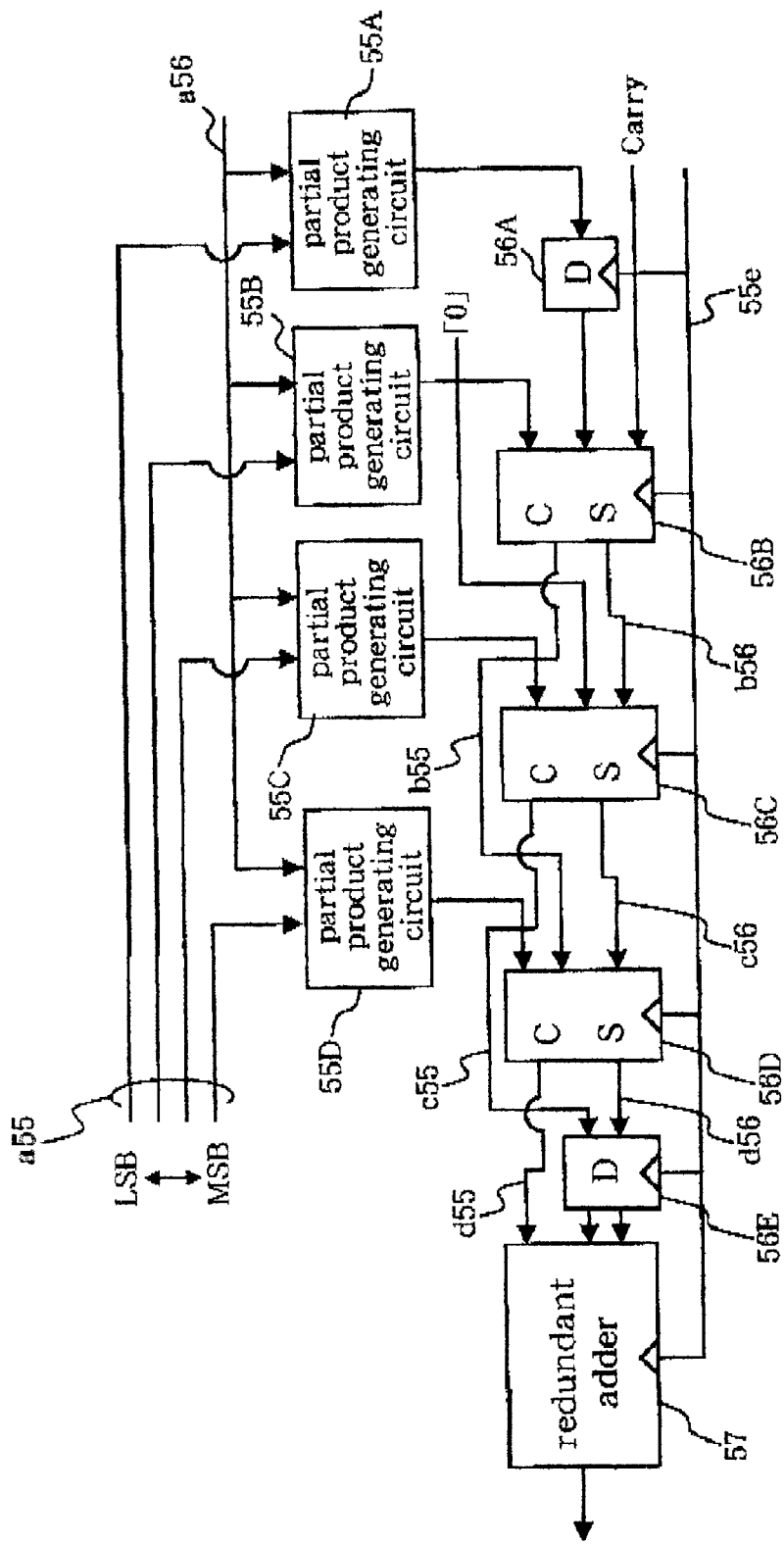
FIG. 18 a block diagram of a semiconductor circuit for arithmetic processing of an thirteenth embodiment of the present invention.

In the thirteenth embodiment, the present invention is applied to a semiconductor circuit for arithmetic processing for realizing multiplication from an upper order digit by repeated addition. This semiconductor circuit for arithmetic processing is shown in FIG. 18. The semiconductor circuit for arithmetic processing of FIG. 18 comprises partial product generating circuits 55A–55D, unitary delay memories 56A and 56E, adders with built-in delay memory 56B–56D, and a redundant adder 57. Here, a 4-bit multiplier is exemplified.

A multiplicand a55 is input to the partial product generating circuits 55A–55D. At this time, the most significant digit data of the multiplicand a55 is input to the partial product generating circuit 55D, data of the digit below the most significant digit is input to the partial product generating circuit 55C, data of the digit two digits down from the most significant digit is input to the partial product generating circuit 55B, and data of the least significant digit is input to the partial product generating circuit 55A. A multiplier a56 is also input to the partial product generating circuits 55A–55D. The multiplier a56 is simultaneously input to the partial product generating circuits 55A–55D sequentially one digit at a time in computation time units from the upper order digit. The partial product generating circuits 55A–55D generate partial products from the multiplicand a55 and the multiplier a56.

Partial products from the partial product generating circuits 55A–55D are subjected to addition processing by the memory 56A and the adders with built-in memory 56B–56D. As a result, the adder 56B adds a partial product from the partial product generating circuit 55A delayed by the memory 56A, and the partial product from the partial product generating circuit 55B, and outputs a carry signal b55 and a sum signal b65 on the next rising edge of control signal 55e. That is, there is a function of storing a computation result internally, and delaying it by one step (computational unit time). The adder with built-in memory 56C adds a value "0", a partial product from the partial product generating circuit 55C, and a sum signal b56 of the adder with built-in memory 56B, and outputs a carry signal c55 and a sum signal c56 on the next rising edge of the control signal 55e.

The adder 56D adds a carry signal b55 from the adder 56b for adding the two lower order digits, a partial product from the partial product generating circuit 55D, and a sum signal from the adder with built-in memory 56C, and outputs a carry signal d55 and a sum signal d56 on the next rising edge of the control signal 55e. The memory 56E delays the carry signal c55 from the adder 56C for adding two lower order digits and a sum signal of the adder with built-in memory 56D, and outputs them to the redundant adder 57.

The memories 56A and 56E, and the adders with built-in memory 56B–56D left shift data one digit at a time towards the redundant adder 57 side, under the control of a control clock e55. Also, the memory 55E is required to convert the carry signal d55 generated by the adder with built-in memory 56D and another result to the same digit.

The redundant adder 57 performs addition from an upper order digit using the carry signal d56 from the adder 6 delayed by the memory 56E, the carry signal c55 from the adder with built in memory 56C, and the carry signal d55 from the adder 56D. This adder has substantially the same design as the upper order digit preceding adder disclosed in the first embodiment for a binary SD number system. Besides the two inputs of the SD system to the adder 1, the inputs to the binary system have been increased by one. It is possible to include a condition for outputting Carry+1 and Sum 1 when the internal sum value of table 2 is +3. In this way, multiplication results are output sequentially from an upper order digit.

Figure 19:
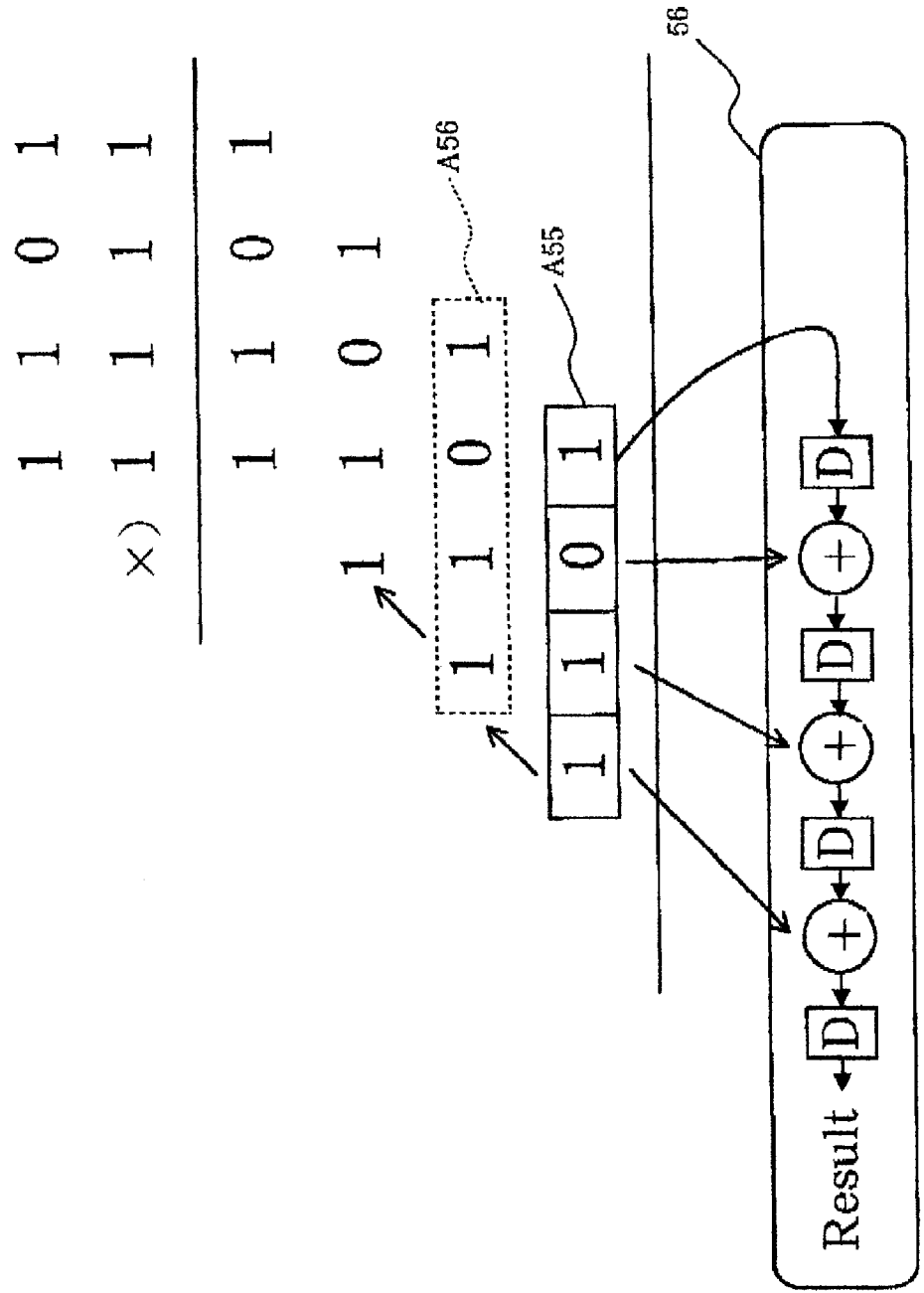
FIG. 19 is an explanatory drawing for describing multiplication in the thirteenth embodiment.

According to the thirteenth embodiment, as shown in FIG. 19, in the case of 4-bit×4-bit multiplication, partial products are generated in the same format as if it were worked out on paper, and these are added.

The adding line section 56 is a simple representation of the adding arrangement for this multiplication method. In the adding section 56, "+" symbols enclosed in a circle represent adders that can carry out addition from an upper order digit, and the symbol "D" enclosed in a square represents a memory. The memory stores input data every one computation time unit. The "+" symbols and "D" symbols are arranged in pairs, but correspond to 56B–56D in FIG. 18. In order to add these partial products, the memories D are previously reset to "0". In the first step, data representing the lowest line A55 of a calculation as if it were worked on paper is input to the adding section 56, and this data is stored.

At a second timing, data input from the memory "D" is left shifted (multiplied by 2). At the same time, data representing the line two from the bottom A56 is input to the adding section 56, and the input data and data being stored in the adding section 56 are added. Data stored in the adding section 56 is obtained by shifting previous line A55.

At a third timing, the addition result obtained at the second timing is left shifted and stored. After that, the upper line is also added repeatedly to output a final result.

In this way, according to the thirteenth embodiment when multiplication is implemented by repeating addition, result can be output from a final stage, and from an upper order digit.

In the thirteenth embodiment, 4-bit×4-bit multiplication has been assumed, there is no particular limitation to 4-bits. When multiplication of greater than 4-bits is performed, it is possible to simply increase adders having built-in memory having three inputs of the partial product data from the partial product generating circuits, the carry data from the adder two digits below and the addition sum data from the adder one digit below, like the adder with built-in memory 56D.

It is also possible to have combinations of already known decode techniques, such as both decoders.

In FIG. 18, the structure is such that carry data is input to the adder two digits above order digits because a carry signal of the adders 56B–56D is delayed, but it is also possible to remove this delay memory and directly input carry data to an adder one digit above.

Further, with multiplication from an upper order digit, the number system used is not limited to the binary system or the binary SD system.

[Fourteenth Embodiment]

Figure 20:
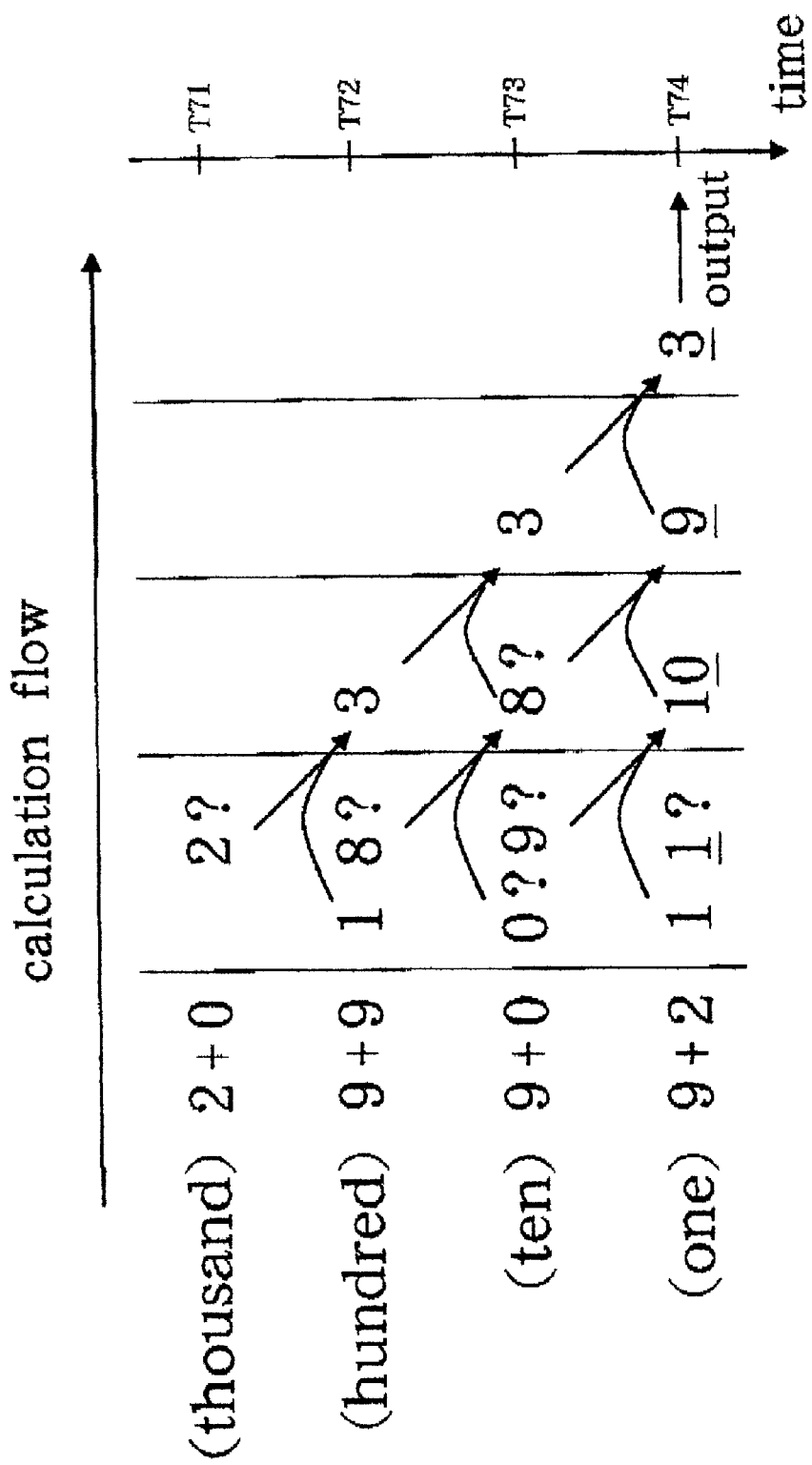
FIG. 20 is an explanatory drawing for describing the principal of a fourteenth embodiment of the present invention.

In the fourteenth embodiment, addition computation from an upper digit is carried out using a general number system is used and not a redundant number system. For this reason, in the fourteenth embodiment a flag representing whether a number that is the object of computation is defined or indeterminate is provided. This element is shown in FIG. 20. In FIG. 20, a decimal addition of $[2999]_D + [902]_D = [3901]_D$ is exemplified. In this addition example, a carry generated in the lower order digit is propagated from the units column to the hundreds column.

At time T71, numbers in the thousands column are added and a value of $[2]_D$ is obtained. There is a possibility that this value $[2]_D$ will be changed by a carry signal from a lower order digit. At this time, the flag can be attached to the value $[2]_D$. In the fourteenth embodiment, a question mark, namely "?" is used as the flag.

At time T72, the numbers in the hundreds column are added, and a value $[18]_D$ is obtained. With this value $[18]_D$ a value $[1]_D$ is generated as a carry signal, and a sum signal has a value of $[8]_D$. The carry signal $[1]_D$ updates the value $[2]_D$ in the thousands column to $[3]_D$.

Here, the sum signal value $[8]_D$ has no effect on signals at or below the lower tens column, and does not constitute a carry signal to the thousands column. For this reason, the "?" mark attached to the number in the thousands column is removed and the value $[3]_D$ is defined.

At time T73, numbers in the tens column are added and a value of $[09]_D$ is obtained. With this value $[09]_D$ the carry signal has a value of $[0]_D$. There is a possibility that the carry signal value $[0]_D$ or the sum signal value $[9]_D$ will be updated by the calculation result of the units column. For this reason, the carry signal value $[0]_D$ in the addition result, and the sum signal value $[9]_D$ both have the mark "?" attached.

Accordingly, since the carry signal from the tens column has not been defined, the "?" mark attached to the value $[8]_D$ of the sum signal for the hundreds column is propagated without being removed.

At time T74, numbers in the units column are added and a value $[11]_D$ is obtained. With this value $[11]_D$, a value $[1]_D$ is generated as a carry signal, and the sum signal is a value $[1]_D$.

The value $[1]_D$, being the carry signal for the units column, is added to the value $[9]_D$, being the sum signal for the tens column. As a result, a value $[10]_D$ is obtained in the tens column, and a value $[1]_D$, being the carry signal, is generated. This carry signal is added to the value $[8]_D$ being the sum signal for the hundreds column.

The carry signal is then propagated to the hundreds column and the tens column. Since the carry signal from the units column is defined as $[1]_D$, the values of the sum signal of the tens column, the carry signal from the tens column and the sum signal from the hundreds column are all defined. These operations are repeated to sequentially output defined values and a value of $[3901]_D$, being the correct addition result, is obtained. In FIG. 20, the digits that will be output are underlined.

Figure 21:
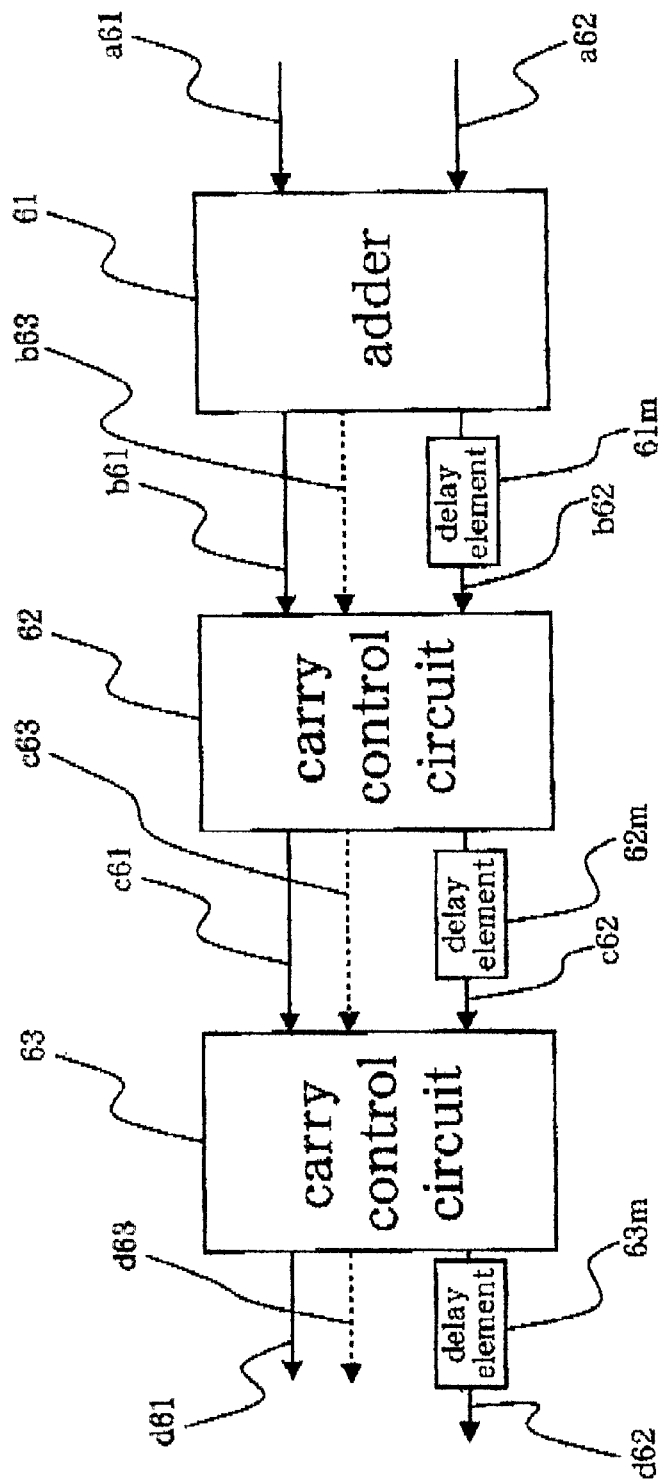
FIG. 21 a block diagram of a semiconductor circuit for arithmetic processing of the fourteenth embodiment.
Figure 2:
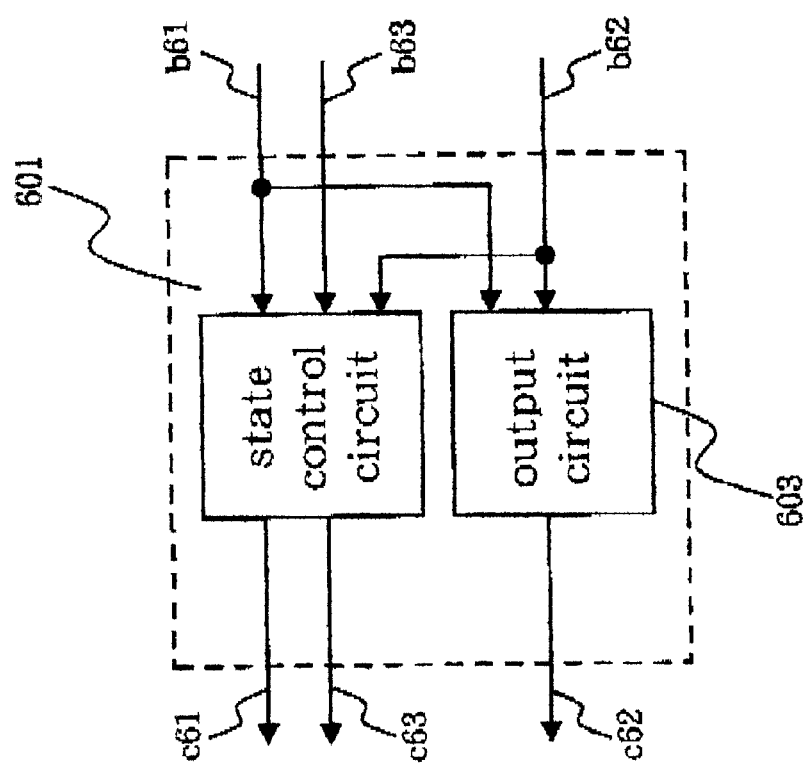

A semiconductor circuit for arithmetic processing for doing this is shown in FIG. 21. With this semiconductor circuit for arithmetic processing a signal corresponding to a flag only in the carry signal (the "?" mark in FIG. 20) is added as a state signal. The semiconductor circuit for arithmetic processing of FIG. 21 comprises an adder 61, carry control circuits 62 and 62, and respective delay elements 61m, 62m and 63m.

The adder 61 adds one digit of data a61 input from r digit of a first number and one digit data a62 input from an upper order digit of a second number. The adder 61 outputs a carry signal b61 and a sum signal b62 as a result. The adder 61 also outputs a state signal b63. The state signal b63 indicates whether or not there is a possibility of the carry signal b61 being generated. If the state signal b63 is true, it indicates that there is a possibility of the carry signal b61 being generated. The sum signal b62 is delayed by one step (computation time unit), namely delayed by one digit, by the delay element 61m, and stored.

The carry control circuit 62, as shown in FIG. 22, comprises a state control circuit 601 and an output circuit 603. The carry control circuit decides whether or not a carry is needed, in accordance with the carry signal b61, and the state signal b63 and the delayed addition result b62, and changes the result as required. To make the decision, the carry control circuit has an input output relationship as shown in the following table 5 internally stored.

TABLE 5

| input | result component | 0–8 | | | 9 | | |
|---|---|---|---|---|---|---|---|
| | carry component | 0 | 0 | 1 | 0 | 0 | 1 |
| | state signal | ? | fixed | fixed | ? | fixed | fixed |
| output | result component | | 0–8 | 1–9 | 9 | 9 | 0 |
| | carry component | | 0 | 0 | 0 | 0 | 1 |
| | state signal | | fixed | fixed | ? | fixed | fixed |

In accordance with table 5, processing is different depending on the input addition result b12.

When the input addition result b12 is a value of "0"–"8", there is no possibility of carry signal propagation to the upper digit, and so the state control circuit 601 outputs a carry signal c61 representing the value "0", and a state control signal c63 representing "fixed". The output circuit 603 outputs the input addition result signal b62 and a result component c62 representing the same value when the input carry signal b61 has a value "0", and when the input carry signal b61 has a value "1" outputs a result component c62 representing a value of "1" added to the input addition result signal b62.

When the input addition result b12 has a value of "9", the state control circuit 601 outputs carry data c61 representing a value the same as the input carry data b61, and a state signal c63 representing a value the same as the input state signal c63. When the input carry signal b61 has a value of "1", a result component c62 having a value of "0" is output, and when the input carry signal b61 has a value of "0" a result component having a value of "9" is output.

The state signal c63 generated in this way is output to the carry control circuit 63 by the carry control circuit 62. The carry control circuit 62 also generates a carry signal c61 from the carry signal b61 and the sum signal b62. The carry control circuit 62 then outputs the generated carry signal c61 to the carry control circuit 63.

The output circuit 603 generates a sum signal c62 based on the sum signal b62 from the memory 61m and the carry signal b61. Specifically, the output circuit 603 adds the value of the carry signal b61 to a sum signal b62 from the memory 602, namely a stored value, as shown in table 3, and generates the sum signal c62. The output circuit 603 outputs the generated sum signal c62 to the carry control circuit 63.

The carry control circuit 62 thus generates the carry signal c61, the sum signal c62 and the state signal c63 based on the carry signal b61, the sum signal b62 and the state signal b63, and outputs these signals to the carry control circuit 63. In a similar manner, the carry control circuit 63 generates a carry signal d61, a sum signal d62 and the state signal d63 based on the carry signal c61, the sum signal c62 and the state signal c63, and outputs these signals to a final stage circuit 63.

According to the fourteenth embodiment, the output of the carry control circuit 62 constitutes the input of the carry control circuit 63 having the same function. By connecting a plurality of stages in this way, it is possible to propagate a carry across a plurality of stages, for example, when calculating $[999+001]_D$, and changes occurring because of the carry can be absorbed.

Thus, according to the fourteenth embodiment, in order to process the carry signal, when the calculated value is indeterminate and there is a possibility that it will be changed later the mark "?" is attached. In this way, it is possible to remove the influence of the carry. Also, according to the fourteenth embodiment, since there is a binary output it is possible to increase affinity with a current circuit.

In the fourteenth embodiment a decimal number has been used as the computation example, but it is not limited to a decimal number and binary or the like can also be used.

[Fifteenth Embodiment]

Figure 23:
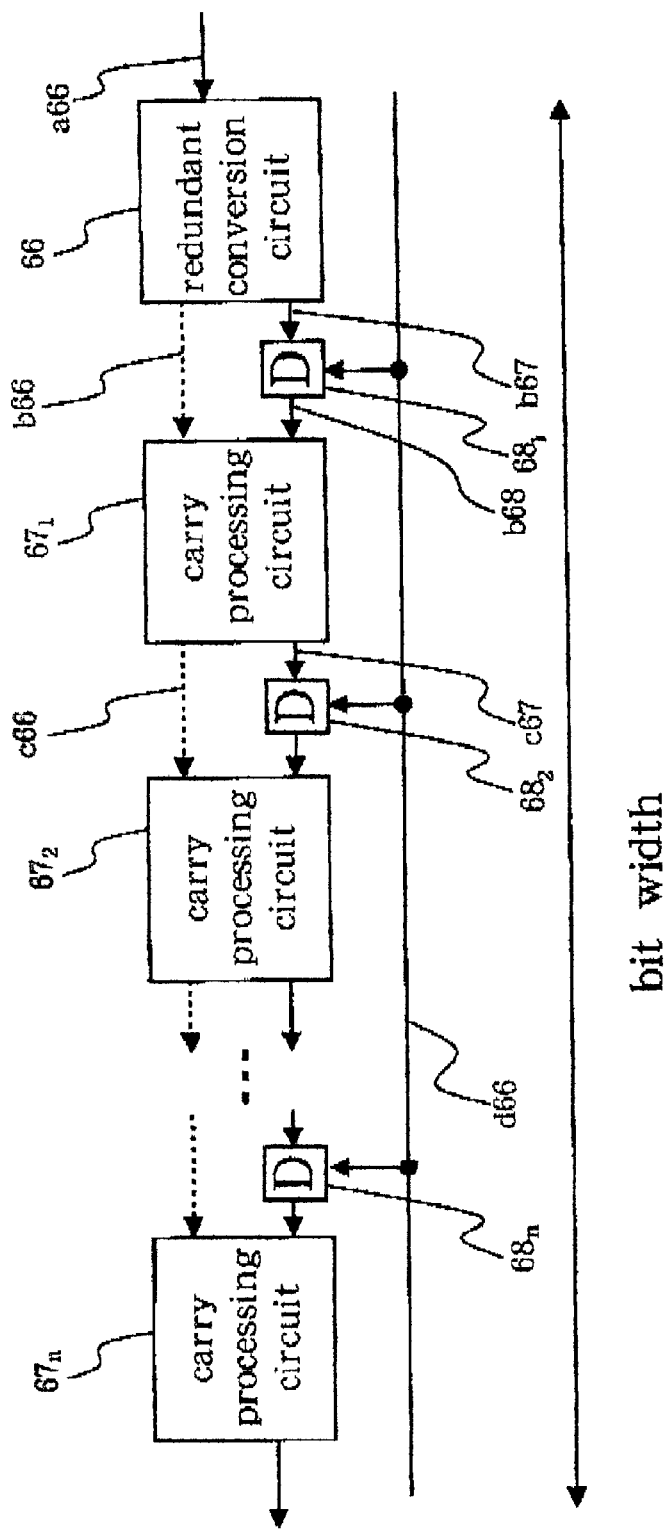
FIG. 23 a block diagram of a semiconductor circuit for arithmetic processing of a fifteenth embodiment of the present invention.

In the fifteenth embodiment, the present invention is applied to a semiconductor circuit for arithmetic processing for converting data of a redundant number system to data in a non-redundant number system. This semiconductor circuit for arithmetic processing is shown in FIG. 23. The semiconductor circuit for arithmetic processing of FIG. 23 comprises a redundant conversion circuit 66, carry processing circuits $67_1$–$67_n$, and memories $68_1$–$68_n$. With the semiconductor circuit for arithmetic processing of FIG. 23, at the time of the worst input pattern there is a possibility that a carry will be generated, from the least significant digit to the most significant digit, which means that it is necessary to have circuits for several digits for both the redundant conversion circuit and the carry processing circuits $67_1$–$67_n$.

Data a66 representing one digit of a number belonging to a redundant number system is input to the redundant conversion circuit 66. The data a66 is input sequentially from the upper order digit every computation time unit.

When the data a66 is input, the redundant conversion circuit 66 converts the data a66 to data of a non-redundant number system and outputs the data b67. As a result, the redundant conversion circuit 66 generates a carry signal b66 as required. In order to perform this type of conversion, the redundant conversion circuit 66 internally holds the input relationship shown in table 6 below.

TABLE 6

| input | data | 1 | 0 | −1 |
|---|---|---|---|---|
| output | carry signal | 0 | 0? | −1 |
| | conversion result | 1 | 0 | 1 |

According to FIG. 6, when "1" is input as data a66 the redundant conversion circuit 66 generates a carry signal (Carry) b66 of "0" and a conversion result (Result) b67 of "1". When "−1" is input as data a66, the redundant conversion circuit 66 generates a carry signal b66 of "−1" and a conversion result b67 of "1". Specifically, in order to ensure that the conversion result is in a non-redundant number system, the redundant conversion circuit 66 generates a carry signal b66 of "−1" in the case of a binary SD number.

The redundant conversion circuit 66 also attaches a signal, being the mark "?", when there is a possibility that the value of the carry signal b66 will be changed by the carry signal from the lower order digit. That is, when "0" is input as data a66, the redundant conversion circuit 66 generates a carry signal b66 of "0?" and a conversion result b67 of "0".

The redundant conversion circuit 66 outputs the generated carry signal b66 to a carry processing signal $67_1$, and outputs the conversion result b67 to the memory $68_1$.

The memory $68_1$ delays the conversion result b67 from the redundant conversion circuit 66 by one step (computation time unit) using the control clock d66. The memories $68_2$–$68_n$ have a function of causing the input data to be delayed by one computational time unit, similarly to the memory $68_1$.

The processing circuit $67_1$ receives as input the carry signal b66 coming from the lower order digit, and a conversion result b68 that is the conversion result b67 delayed and output by the memory $68_1$, and converts them. In order to perform this conversion, the carry processing circuit $67_1$ internally holds the input output relationship shown in table 7 below.

TABLE 7

| input | | | | | | |
|---|---|---|---|---|---|---|
| conversion result | 0 | 0 | 0 | 1 | 1 | 1 |
| carry signal output | -1 | 0 | 0? | -1 | 0 | 0? |
| | | | | | | |
| carry signal | -1 | 0 | 0? | 0 | 0 | 0 |
| conversion result | 1 | 0 | 0 | 1 | 1 | 1 |

In accordance with table 7, when there is no "?" mark attached to the carry signal b66, the carry signal components becomes defined. As a result, there is no need for recalculation by the circuits on the upper digit side, and it is possible to determine the computation result.

When there is "?" mark attached to the carry signal b66, then if the carry signal b66 is "0?" and the conversion result b68 is "0" the carry processing circuit $67_1$ generates a carry signal c66 of "0?" and a conversion result c67 of "0". Also, if the carry signal b66 is "0?" and the conversion result b68 is "1" the carry processing circuit $67_1$ generates a carry signal c66 of "0" and a conversion result c67 of "1".

The carry processing circuit 67 outputs the carry signal c66 generated in this way to the carry processing circuit 672 of the next stage, and outputs the conversion result c67 to the carry processing circuit $67_2$ of the nest stage via the delay memory $68_2$. The carry processing circuit $67_2$–$67_n$ perform similar the carry processing circuit $67_1$.

According to this fifteenth embodiment, it is possible to convert data in a redundant number system to data in a normal non-redundant number system.

With the fifteenth embodiment, a case where a binary SD number in a redundant number system is converted to a binary number has been described as an example of computation processing, but the present invention is not particularly limited to this number system and it is possible to use a multi-value redundant number system such as base-4 or octal (base-8), and it is also possible to make an expanded number positive.

First to fifteenth embodiments have been described above, but the present invention is not limited to these embodiments. For example, "digit" does not have to be a decimal number and it possible to use units of "bits" in a binary system, and to use groups of bits in a base-4 number system.

Also, an addition instruction has been taken as an example of a computation instruction, but any computation instruction is possible as long as computing can be performed every digit, such as a subtract instruction or a compare instruction.

As a redundant number system, the present invention does not have to be limited to a system that allows "-1" in a binary number "0, 1", such as the binary SD number system, and it is also possible to use systems such as 11-valued decimal (as well as "0–9", "A=10" is permitted) or 3-values binary ("2" is permitted in "0, 1").

It is also possible to replace transistors in all circuits implemented with conventional transistors with neuron MOS transistors.

Industrial Application

According to the present invention it is possible to realize a circuit for processing data from information of an upper order digit representing more important information.

According to one form of the present invention it is possible to realize a semiconductor circuit for arithmetic processing of a plurality of groups from an upper order digit.

According to another form thereof the present invention it is possible to obtain a semiconductor circuit for arithmetic processing that can absorb a propagation signal from a lower order digit such as in addition processing by using a redundant number system, and that enables arithmetic processing from an upper order digit.

According to yet another form of the present invention it is possible to realize a semiconductor circuit for arithmetic processing from a complete upper order digit with no carry signals at all, looking from outside the circuit.

According to still another form of the present invention a semiconductor circuit for arithmetic processing from an upper order digit that van process a carry signal from a lower order digit without using a redundant number system is also made possible.

According to one form of the present invention it is possible to realize a semiconductor circuit for arithmetic processing that can omit lower order digit side computation from digits for which there is a result decision.

According to another form of the present invention it is possible to obtain a semiconductor circuit for arithmetic processing capable of computational comparison decision from an upper order digit, that is not dependent on a signal from a lower order digit based on a minimum value and a maximum value.

According to one form of the present invention it is possible to realize a semiconductor circuit for arithmetic processing for processing from an upper order digit aimed at a general purpose processor, or a semiconductor circuit for arithmetic processing that can vary a function in real-time while having simple hardware.

According to yet another form of the present invention it is possible to realize a semiconductor circuit for arithmetic processing that can binary convert a redundant number system from an upper order digit.

According to still another form of the present invention it is possible to realize a semiconductor circuit for arithmetic processing that can carry out processing from sequential upper order digits for a compact analog signal.

According to one more form of the present invention it is possible to realize a semiconductor multiplier that outputs a result from an upper order digit.

According to yet another form of the present invention it is possible to realize a semiconductor multiplier from an upper order digit using different techniques.

According to another form of the present invention a processing circuit from an upper order digit introducing a concept of intelligent computation, that reduces the scale of a circuit and increases computing unctions, by using neuron MOS transistors.

According to one form of the present invention it becomes possible to use a method capable of arithmetic processing from an upper order digit by using a redundant number system.

According to another form of the present invention a high speed processing method becomes possible that can omit remaining computation at a point in time where a computation from an upper order digit has been defined.

What is claimed is:

1. A semiconductor circuit for arithmetic processing, being a semiconductor circuit receiving as input at least one numerical data item comprised of a plurality of digits, input sequentially one digit per computing time unit from the upper digit of the numerical data, provided with a computing unit for computing of the input data, the computing unit comprising:

a computing circuit, for computing input digit data within a computing time unit, and outputting a computation result representing a result obtained by the computation to generate a carry using the computation and outputting carry data representing this carry; and delay means for delaying the computational result from the computing circuit by only a single computing time unit.

2. The semiconductor circuit for arithmetic processing of claim 1, wherein a plurality of the computing units are connected in series, and each of the computing units performs processing sequentially every computation time unit.

3. The semiconductor circuit for arithmetic processing of claim 2, wherein the computing unit comprises:

first decision means for deciding whether or not carry data output to an upper digit as a result of computation of a particular digit is changed using carry data generated by computation for a lower digit than that digit;

output means for indicating that there is no change to carry data to an upper order side, when a decision result from the first decision means indicates that there is no dependency on carry data output from the lower order digit;

input means for holding lower order side carry data, when the decision result from the first decision means indicates that there is dependency on carry data output from the lower order is digit; and changing means for changing a computational result in response to lower order digit carry data from the lower order side.

4. The semiconductor circuit for arithmetic processing of claim 1 wherein the numerical data, the computational result or the carry data belong to a redundant number system.

5. The semiconductor circuit for arithmetic processing of claim 4, wherein a computing block for computing data belonging to the redundant number system comprises at least one of the computing units and a computing circuit for processing output of the computing block, and carry data to an upper order digit is not generated from the computing block.

6. The semiconductor circuit for arithmetic processing of claim 1 wherein the computing unit comprises:

first decision means for deciding whether or not carry data output to an upper digit as a result of computation of a particular digit is changed using carry data generated by computation for a lower digit than that digit;

output means for indicating that there is no change to carry data to an upper order side, when a decision result from the first decision means indicates that there is no dependency on carry data output from the lower order digit;

input means for holding lower order side carry data, when the decision result from the first decision means indicates that there is dependency on carry data output from the lower order digit; and changing means for changing a computational result in response to lower order digit carry data from the lower order side.

7. The semiconductor circuit for arithmetic processing of claim 6, wherein a computing block converts data sequentially input from an upper order digit every computing time unit to a non-redundant number system when data belongs to a redundant representation and if conversion is necessary, conversion means for converting to a non-redundant representation and a carry signal, or a borrow signal, and output means for outputting the carry signal or the borrow signal to a computing unit for an upper order digit, the semiconductor circuit for arithmetic processing having an overall function of converting a redundant number system to a non-redundant number system.

8. The semiconductor circuit for arithmetic processing provided in claim 1 further comprising:

decision means for comparing and deciding, for every computing time unit from an upper digit, computational results output sequentially every computing time unit from the upper digit, wherein when authenticity of the decision result of the decision means has been confirmed, arithmetic processing including comparison and decision for remaining lower order digits is omitted.

9. The semiconductor circuit for arithmetic processing of claim 8, further comprising:

computing means for sequentially carrying out computation every computing time unit from an upper digit side and computing a maximum value and a minimum value for computational results acquired at a lower digit than an input digit; and comparison means for comparing at least one of the maximum value and the minimum value computed by the computing means with data of another digit.

10. The semiconductor circuit for arithmetic processing of claim 1, further comprising:

computing means for sequentially carrying out computation every computing time unit from an upper digit side and computing a maximum value and a minimum value for computational results acquired at a lower digit than an input digit; and comparison means for comparing at least one of the maximum value and the minimum value computed by the computing means with data of another digit.

11. The semiconductor circuit for arithmetic processing of claim 1 provided with switching means for switching a computing function for input digit data by supplying a control instruction to the computing unit.

12. The semiconductor circuit for arithmetic processing of claim 1, wherein the computing unit is formed using neuron MOS transistors.

13. The semiconductor circuit for arithmetic processing of claim 1, further comprising, in order to convert analog data to digital data by narrowing the comparison range of the analog data;

conversion means for converting the analog data sequentially every computation time unit from an upper order digit side of the digital data; and the computing unit or the computing circuit for computing output of the conversion means every computation time unit from an upper order digit.

14. An arithmetic processing method receiving input of at least one numerical data item comprised of a plurality of digits, one digit being input sequentially per computing time unit from an upper order digit of the numerical data, comprising:

a first process of computing data of an input digit in computing time units and outputting a computation result obtained by computation;

a second process of generating a carry as a result of the computation of the first process and outputting carry data representing this carry; and a third process of delaying the computational result by a single computing time unit.

15. The arithmetic processing method of claim 12, wherein from the first process to the third process is sequentially repeated.

16. The arithmetic processing method of claim 15, further comprising:

a fourth process of sequentially judging computation results of the first process from an upper order digit, and a fifth process of suspending computation of lower order digits at a point in time where a judgement result of the fourth process is defined.

* * * * *